Nov. 4, 1958

C. M. GRINAGE 2,859,290

MACHINE TOOL CONTROLLER

Filed April 7, 1955

INVENTOR.
CLAUDE M. GRINAGE.
BY
ATTORNEY

Nov. 4, 1958  C. M. GRINAGE  2,859,290
MACHINE TOOL CONTROLLER
Filed April 7, 1955  10 Sheets-Sheet 3

INVENTOR.
CLAUDE M. GRINAGE
BY
ATTORNEY

Nov. 4, 1958

C. M. GRINAGE 2,859,290

MACHINE TOOL CONTROLLER

Filed April 7, 1955

INVENTOR.
CLAUDE M. GRINAGE

BY
Paul M. Gist

ATTORNEY

Nov. 4, 1958

C. M. GRINAGE 2,859,290

MACHINE TOOL CONTROLLER

Filed April 7, 1955

*INVENTOR.*
CLAUDE M. GRINAGE
BY
*ATTORNEY*

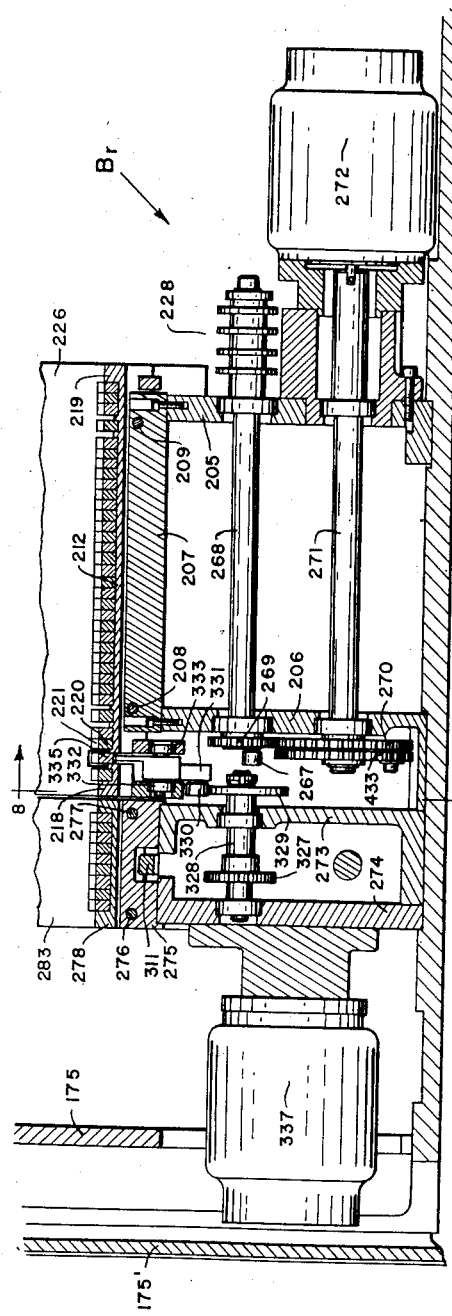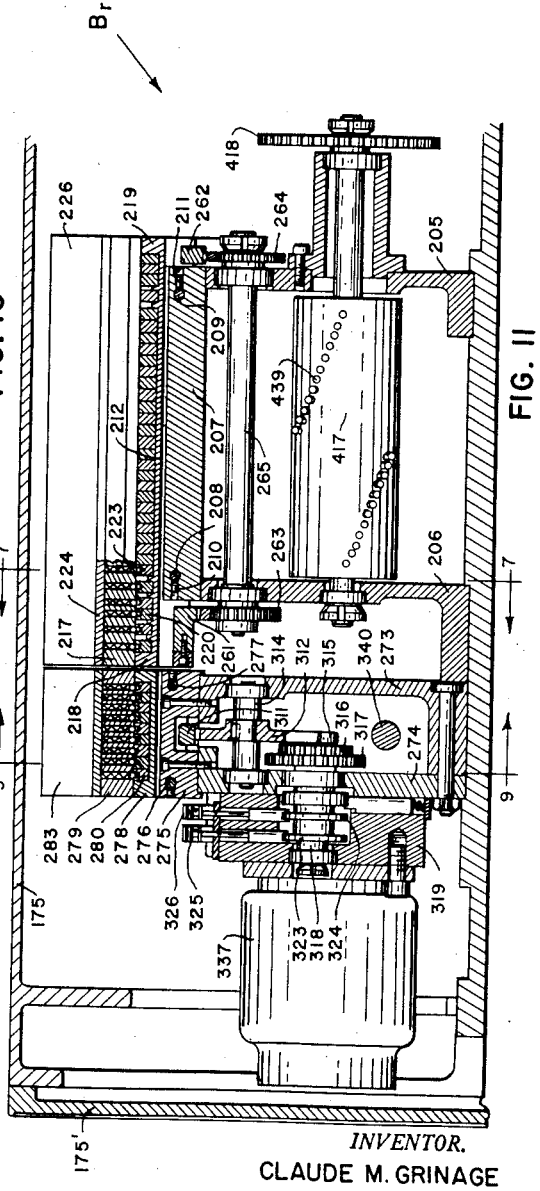

Nov. 4, 1958

C. M. GRINAGE 2,859,290

MACHINE TOOL CONTROLLER

Filed April 7, 1955

INVENTOR.
CLAUDE M. GRINAGE
BY
ATTORNEY

Nov. 4, 1958

C. M. GRINAGE 2,859,290

MACHINE TOOL CONTROLLER

Filed April 7, 1955

*INVENTOR.*
CLAUDE M. GRINAGE
BY
ATTORNEY

Nov. 4, 1958     C. M. GRINAGE     2,859,290
MACHINE TOOL CONTROLLER
Filed April 7, 1955     10 Sheets—Sheet 9
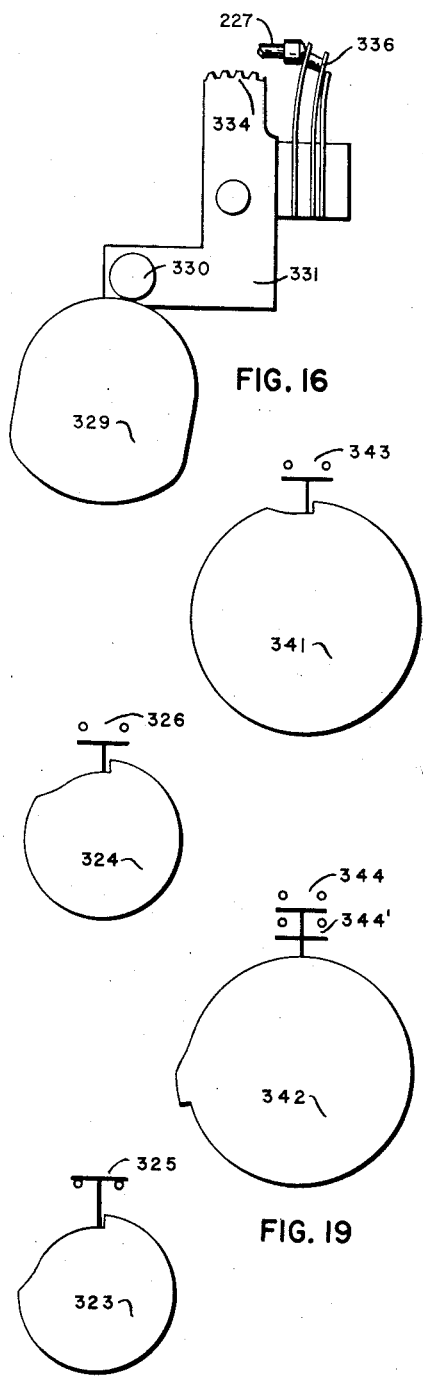
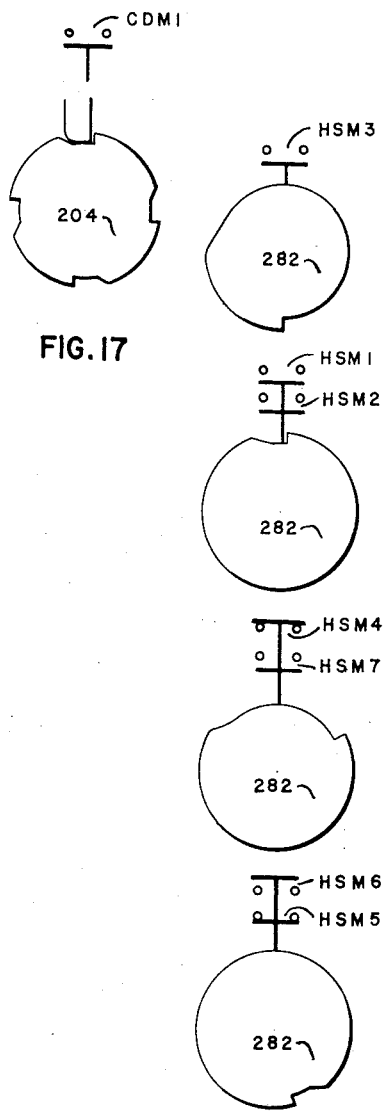
INVENTOR.
CLAUDE M. GRINAGE
BY
ATTORNEY

INVENTOR.
CLAUDE M. GRINAGE

United States Patent Office 2,859,290
Patented Nov. 4, 1958

2,859,290

MACHINE TOOL CONTROLLER

Claude M. Grinage, Stratford, Conn., assignor to The Bullard Company, a corporation of Connecticut Application April 7, 1955, Serial No. 499,921

59 Claims. (Cl. 200—18)

The present invention relates to machine tools, and particularly to a new and improved programming attachment capable of rendering a machine tool completely automatic.

The principal object of this invention is to provide a separate manual and automatic controller for a machine tool arranged in parallel so that when either one is effective, the other is ineffective.

Other objects include the provision of an automatic machine tool controller in which the programming mechanism includes in-line pusher-type, as distinguished from cam-type actuating means; the provision of such a controller embodying in-line pusher-type actuating means for both function selection and duration, mechanically connected and operated by a synchronous motor to maintain them in exact phase relation; the provision of such a controller embodying function selecting and duration means, mechanically connected and operated by a synchronous motor that is energized in response to the movement of the pusher-type actuating means; the provision of such an automatic controller embodying a crank for reciprocating the pusher-type actuating means and arranged to give maximum power to insure the rendering effective of both the function selecting and duration means, the provision of such a controller in which the variable acceleration of the crank is employed to effect smooth operation of the pusher-type actuating means; and the provision of such a controller in which separate function selecting mechanisms are employed in definite timed relation.

The above as well as other objects and novel features will become apparent from the following specification and accompanying drawings, in which:

Fig. 10 is a partial sectional elevational view taken substantially along line 10—10 of Fig. 6;

Fig. 11 is a sectional elevational view taken substantially along line 11—11 of Fig. 6;

Figure 1:
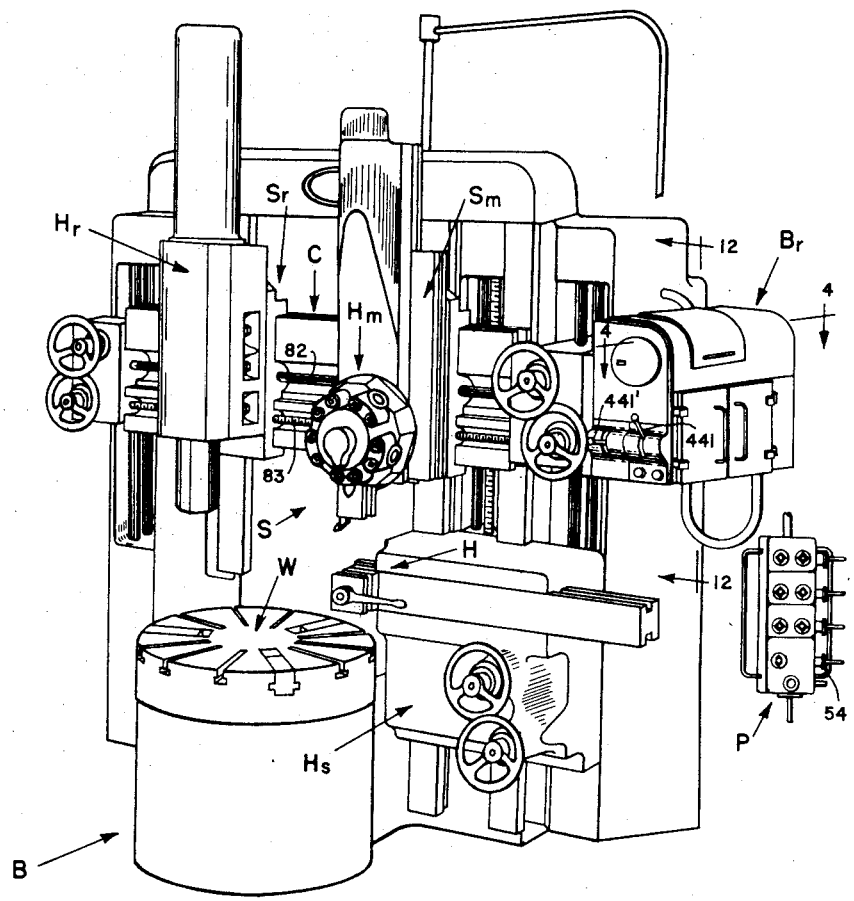
Figure 1 is a perspective view of a machine tool to which the principles of the invention have been applied.
Figure 21:
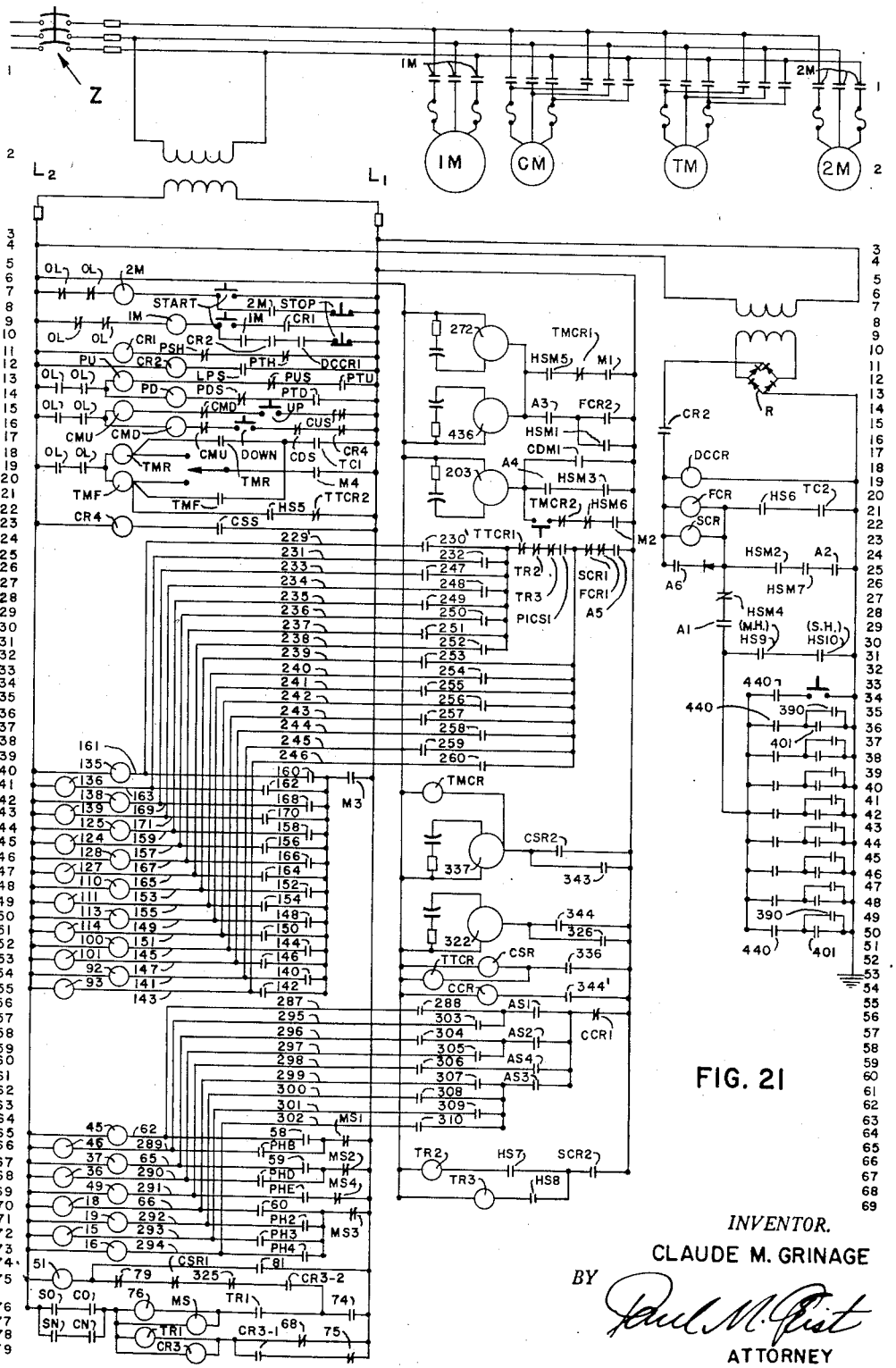

Figs. 16 to 20 inclusive are elevational views of certain cams within the bracket $B_r$ of Fig. 1; and Fig. 21 is a wiring diagram of certain essential features of the invention.

Referring to Fig. 1, the principles of the invention are shown as applied to a vertical turret lathe of the type described and claimed in patent application Serial No. 386,166 filed October 15, 1953 in the name of E. C. Bullard, et al. It comprises a base B that supports a rotatable work-supporting table W, and a standard S to the rear of the table W. A cross rail C is mounted on the standard S for vertically adjustable motion, and saddles $S_m$ and $S_r$ are mounted on the cross rail C for horizontal reciprocation. A main head $H_m$ and a ram head $H_r$ are mounted on the saddles $S_m$ and $S_r$, respectively, for vertical reciprocation. A side head $H_s$ is mounted on the standard S to the right of the table W (Fig. 1), and it includes a tool-supporting head H arranged for horizontal reciprocation. Located within the rear portion of the base B and extending upwardly into the standard S is a combined headstock and feedworks transmission adapted to provide 20 different rates of rotation of the table W as well as 16 different rates of feed movement of the main head $H_m$, the ram head $H_r$ and the side head $H_s$. This combined headstock and feedworks transmission is identical with that shown, described and claimed in the above-referred-to patent application to which reference is made for specific details of construction. Hydraulically-actuated shifting devices are provided for the various clutches and gear shifting means within the transmission, all of which are controlled by solenoid-operated valves that are mounted on a removable bracket attached to the rear of the combined transmission, all as clearly shown, described and claimed in the above-referred-to patent application.

A pendant P is attached to one end of a conduit leading to the rear of the machine. The conduit contains all of the electrical conductors leading from the various solenoid valves previously mentioned. The pendant P contains actuating levers for manually controlling every function of which the machine tool is capable.

Not only is the machine tool capable of complete manual control from the pendant P, but similar brackets $B_r$ may be provided for each of the heads $H_m$, $H_r$ and $H_s$. Such a bracket $B_r$ is attached to each end of the cross rail C and to the side head $H_s$. Each bracket $B_r$ is adapted to support the mechanism for rendering the machine tool completely automatic in relation to its corresponding head. Only the bracket $B_r$ for the head $H_m$ is shown, and when it is effective it renders the pendant P ineffective relatively to head $H_m$. The mechanism in the bracket $B_r$ is capable of causing the machine tool to perform completely automatically every function of head $H_m$ than can be performed by an operator actuating the corresponding controls on the pendant P.

Inasmuch as the specific description of those features of the machine tool which relate to manual control are fully described, disclosed and claimed in the above-referred-to patent application, the description herein will be limited to only those features which are necessary for an understanding of the principles of the mechanism within the bracket $B_r$ for rendering the machine tool completely automatic in relation to the head $H_m$.

Figure 2:
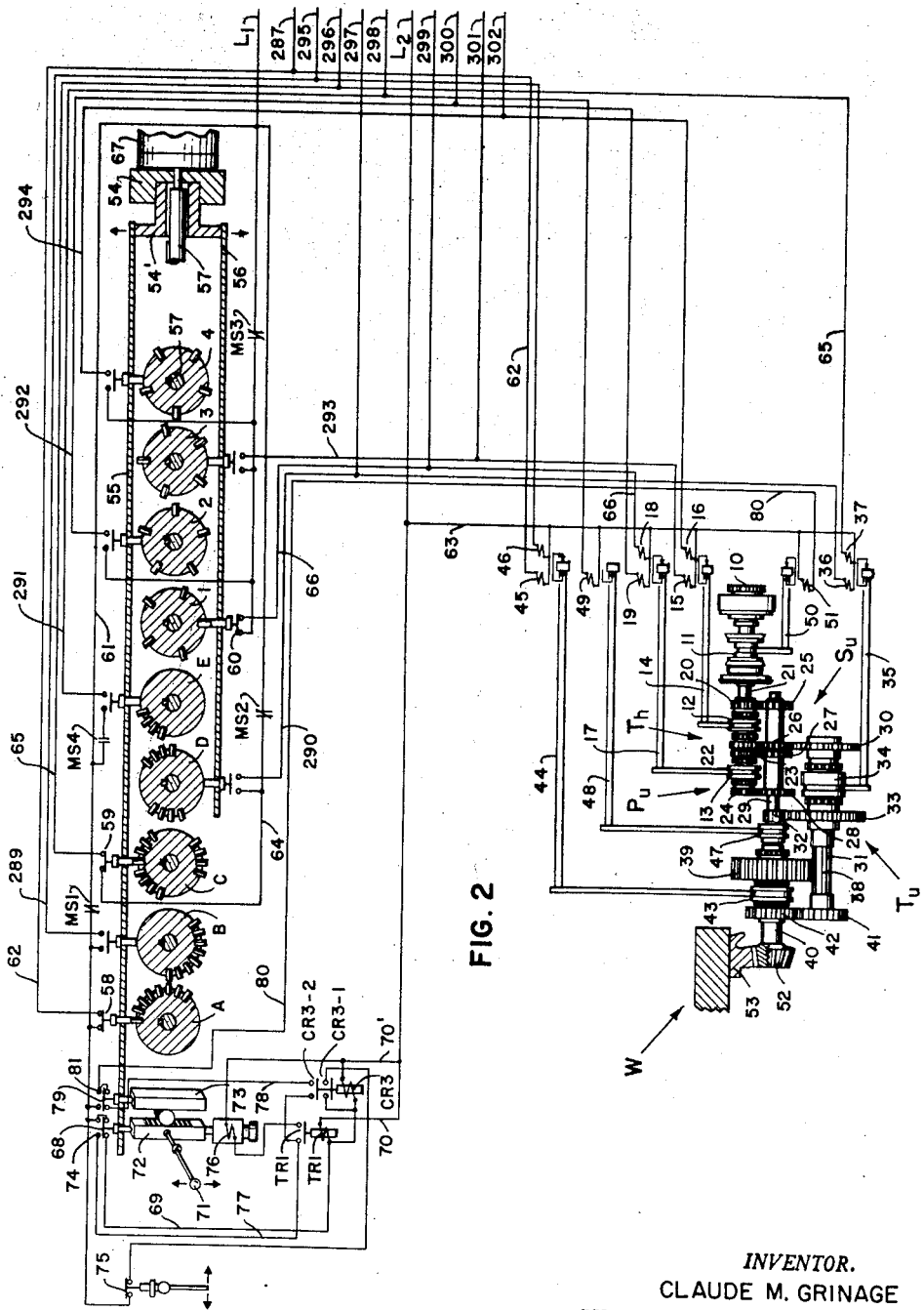
Fig. 2 is a schematic view of the headstock and pendant control therefor.

The work-supporting table W is adapted to be rotated at 20 different rates of speed by a headstock transmission $T_h$, which in the present case is shown diagrammatically in Fig. 2. It includes an input gear 10 that is geared to a V-belt pulley drive (not shown). Power from the gear 10 is transmitted through a combined clutch and brake mechanism 11, thence into a primary unit $P_u$. The primary unit includes two positive-action, axially-shiftable clutch elements 12 and 13. The element 12 is connected to a draw bar 14 that is adapted to be moved rightwardly upon the energization of a solenoid 15, and to be moved leftwardly upon the energization of a solenoid 16. The positive-action clutch 13 is connected to a draw bar 17 that is adapted to be moved leftwardly by the energization of a solenoid 18 and rightwardly by the energization of a solenoid 19. The rightward movement of the clutch 12 connects a gear 20 to a shaft 21 that supports the clutch and brake mechanism 11 as well as the gear 10. Leftward movement of the clutch 12 connects a gear 22 to the shaft 21. Rightward movement of the clutch 13 connects a gear 23 to the shaft 21, and leftward movement of the clutch 13 connects a gear 24 to the shaft 21. The gears 20, 22, 23 and 24 are adapted, respectively, to be maintained in meshing relationship with gears 25, 26, 27 and 28 journaled on a shaft 29. The last-mentioned four gears and the shaft 29 comprise the secondary unit $S_u$.

From the foregoing, it is evident that the shaft 29 is adapted to be rotated at four different rates of speed by the selective shifting of the clutches 12 and 13. The gear 26 on the shaft 29 is in mesh with a gear 30 journaled on a shaft 31 forming part of tertiary unit $T_u$. An additional gear 32 fixed to the shaft 29 is in mesh with a gear 33 also journaled on the shaft 31. A positive-action clutch 34 is located between the gears 30 and 33 and it is fixed to a draw bar 35. Rightward movement of the draw bar 35 is effected by the energization of a solenoid 36, whereas leftward movement of the draw bar 35 is effected by the energization of a solenoid 37. Accordingly, shifting the clutch 34 rightwardly and leftwardly can provide eight different rates of rotation of the shaft 31. A gear 38 formed on the shaft 31 is in mesh with a bull gear 39 journaled on an output shaft 40 that is coaxial with, but separate from the shaft 29 of the secondary unit $S_u$. Another gear 41 fixed to the shaft 31 is in mesh with a spur gear 42 that is also journaled on the output shaft 40. A positive-action clutch 43 is provided between the gears 39 and 42. The clutch 43 is connected to a draw bar 44. Rightward movement of the draw bar 44 is effected by the energization of a solenoid 45, whereas leftward movement of the draw bar 44 is effected by the energization of a solenoid 46. From the foregoing it is evident that selective actuation of the clutches 12, 13, 34 and 43 will provide 16 different rates of rotation of the output shaft 40. A positive-action clutch 47 is located between the output shaft 40 and the coaxial shaft 29. The clutch 47 is connected to a draw bar 48. Rightward movement of the draw bar 48 is effected by the energization of a solenoid 49, and this movement clutches shaft 40 to shaft 29. Accordingly, an additional four speeds of rotation of the output shaft 40 can be effected by the selective actuation of the clutch 47 and the clutches 12 and 13. The output shaft 40, therefore, is adapted to be rotated at 20 different speeds upon the selective energization of the solenoids 15, 16, 18, 19, 36, 37, 45, 46 and 49.

The clutch and brake mechanism 11 is connected to a draw bar 53, the rightward movement of which is adapted to be effected by the energization of a solenoid 51. Normally, the draw bar 50 is hydraulically urged in a leftward direction to thereby engage the brake portion of the mechanism 11 and to disengage the clutch portion thereof.

The output shaft 40 of the transmission $T_h$ is provided with a bevel gear 52 that meshes with a bevel ring gear 53 fixed to the under surface of the table W. From the foregoing it is evident that the work table W can be caused to rotate at 20 different rates of rotation by the selective energization of the previously-described solenoids.

The transmission $T_h$ as shown diagrammatically in the present case is substantially the same as that shown, described and claimed in Patent No. 2,355,625 of E. P. Bullard, III, et al., to which patent reference is made for specific details of construction. The specific construction of the solenoid-operated, hydraulically-actuated valves for controlling the movement of the draw bars 14, 17, 35, 44 and 48 are identical with those shown in Fig. 12 of application Serial No. 386,166 filed October 15, 1953, in the name of Edward C. Bullard, et al. The construction of the hydraulically-actuated, solenoid-controlled valve mechanism for moving the draw bar 50 is identical with that shown in Fig. 11a of the above-identified patent application of E. C. Bullard et al.

Referring to Figs. 1 and 2, the control of the headstock transmission $T_h$ is adapted manually to be effected by the operation of apparatus within the lower compartment of the pendant P. Referring specifically to Fig. 2, a disc 54 is fixed to a cam 54' which when turned, causes supporting bars 55 and 56 to move the various switches of the control away from the switch-actuating mechanism including a shaft 57 and the nine portions A, B, C, D, E, 1, 2, 3, and 4. With the control in the condition as shown in Fig. 2, it is evident that portions A, C, and 1 have closed switches 58, 59 and 60. Closing of the switch 58 causes current to flow from line L1 through a conductor 61, the switch 58, thence through a conductor 62 to the solenoid 45, thence through a conductor 63 to L2. Energization of the solenoid 45 causes the draw bar 44 to be moved rightwardly thereby connecting the gear 39 to the shaft 40. Closing the switch 59 causes current to flow from the line L1 through a conductor 64, thence through the switch 59, a conductor 65, thence through solenoid 37 to line 63 which leads to the line L2. Energization of the solenoid 37 causes the draw bar 35 to be moved leftwardly, thereby connecting the gear 33 to the shaft 31. Closing of the switch 60 causes current to flow from the line L1 through the switch 60, thence through a conductor 66, thence through solenoid 18, to the line 63 leading to the line L2. Energization of the solenoid 18 causes the draw bar 17 to be moved leftwardly thereby connecting the gear 24 to the shaft 21. Accordingly, power from the shaft 21 is thereby caused to flow through the transmission $T_h$ to the work table W to provide one rate of rotation of the table.

Operation of the disc 54 makes it possible to turn a knob 67 attached to the cam shaft 57 to any one of 20 different positions at each of which a different gear train is established in the transmission $T_h$ for providing a different rate of rotation of the table W through the action of the solenoids 15, 16, 18, 19, 36, 37, 45, 46 and 49, inclusive, as represented in the following chart:

| Position of handle 67 | Effective cam sections | Solenoids energized | Clutch Position |
|---|---|---|---|
| 1 | A | 45 | 43 right. |
|   | C | 37 | 34 left. |
|   | 1 | 18 | 13 left. |
| 2 | A | 45 | 43 right. |
|   | C | 37 | 34 left. |
|   | 2 | 19 | 13 right. |
| 3 | A | 45 | 43 right. |
|   | C | 37 | 34 left. |
|   | 3 | 15 | 12 right. |
| 4 | A | 45 | 43 right. |
|   | C | 37 | 34 left. |
|   | 4 | 16 | 12 left. |
| 5 | A | 45 | 43 right. |
|   | D | 36 | 34 right. |
|   | 1 | 18 | 13 left. |
| 6 | A | 45 | 43 right. |
|   | D | 36 | 34 right. |
|   | 2 | 19 | 13 right. |
| 7 | A | 45 | 43 right. |
|   | D | 36 | 34 right. |
|   | 3 | 15 | 12 right. |
| 8 | A | 45 | 43 right. |
|   | D | 36 | 34 right. |
|   | 4 | 16 | 12 left. |
| 9 | B | 46 | 43 left. |
|   | C | 37 | 34 left. |
|   | 1 | 18 | 13 left. |
| 10 | B | 46 | 43 left. |
|    | C | 37 | 34 left. |
|    | 2 | 19 | 13 right. |
| 11 | B | 46 | 43 left. |
|    | C | 37 | 34 left. |
|    | 3 | 15 | 12 right. |
| 12 | B | 46 | 43 left. |
|    | C | 37 | 34 left. |
|    | 4 | 16 | 12 left. |

| Position of handle 67 | Effective cam sections | Solenoids energized | Clutch Position |
| --- | --- | --- | --- |
| 13 | B | 46 | 43 left. |
|  | D | 36 | 34 right. |
|  | 1 | 18 | 13 left. |
| 14 | B | 46 | 43 left. |
|  | D | 36 | 34 right. |
|  | 2 | 19 | 13 right. |
| 15 | B | 46 | 43 left. |
|  | D | 36 | 34 right. |
|  | 3 | 15 | 12 right. |
| 16 | B | 46 | 43 left. |
|  | D | 36 | 34 right. |
|  | 4 | 16 | 12 left. |
| 17 | C | 37 | 34 left. |
|  | E | 49 | 47 right. |
|  | 1 | 18 | 13 left. |
| 18 | C | 37 | 34 left. |
|  | E | 49 | 47 right. |
|  | 2 | 19 | 13 right. |
| 19 | C | 37 | 34 left. |
|  | E | 49 | 47 right. |
|  | 3 | 15 | 12 right. |
| 20 | C | 37 | 34 left. |
|  | E | 49 | 47 right. |
|  | 4 | 16 | 12 left. |

With the control circuit for the headstock transmission $T_h$ in the condition shown in Fig. 2, current also flows from line L1 through conductor 61 to start switch 68, thence through a conductor 69 to TR1 and CR3 solenoids, thence through conductors 70 and 70', respectively, to line L2. Energization of the solenoid TR1 closes normally open switch TR1; and, energization of solenoid CR3 closes the CR3–1 and CR3–2 switches. Moving a hand toggle lever 71 downwardly moves a rack 72 upwardly and a rack 73 downwardly. Upward movement of the rack 72 opens starting switch 68 and closes starting switch 74. Opening of the switch 68 does not de-energize the solenoid TR1 since the CR3–1 switch holds the circuit through the stop switch 75. Closing the switch 74 energizes a solenoid 76 through the switch TR1 and causes a pin to engage the rack 72 for holding it in its upper position after the toggle lever 71 is released by the operator. Closing of the switch CR3–2 permits current to flow from line L1 through conductor 61, switch 74, a conductor 77, contact CR3–2, a conductor 78, a switch 79, a conductor 80, thence through solenoid 51 to the conductor 63 and line L2. Energization of the solenoid 51 causes the draw bar 50 to move rightwardly thereby effecting engagement of the clutch portion of the mechanism 11 and to release the brake portion thereof. Table W, therefore, begins to rotate at the speed established by the gear train previously described.

Since the solenoid 76 causes a pin to lock the rack 72 in its upper position, toggle lever 71 cannot manually be moved to its neutral position. The only way to stop the table W from rotating is to open the switch 75 which de-energizes solenoids TR1 and CR3. Switch TR1 is set to open only after a pre-set time interval following de-energization of the solenoid TR1, while switches CR3–1 and CR3–2 open instantly upon de-energization of the solenoid CR3. This insures solenoid 76 remaining energized and preventing the manual movement of the toggle 71 to neutral position until after the solenoid 51 has been de-energized by the instant opening of switch CR3–2 and the stopping of the table W. When the table W stops, solenoid 76 is de-energized and toggle 71 is returned to its neutral position. The reason for this is to prevent shifting of the gears in the headstock transmission $T_h$ while the table W is rotating.

Movement of the lever 71 upwardly moves rack 72 downwardly and rack 73 upwardly, which latter closes contacts 81 so that current flows from line L1 through conductor 61, contacts 81, conductor 80, solenoid 51, thereby effecting the engagement of the clutch portion of the unit 11 and the release of the brake portion thereof, thereby starting the rotation of the table W. Upon the operator releasing the toggle 71, it automatically returns to its neutral position and the table W stops.

Figure 3:
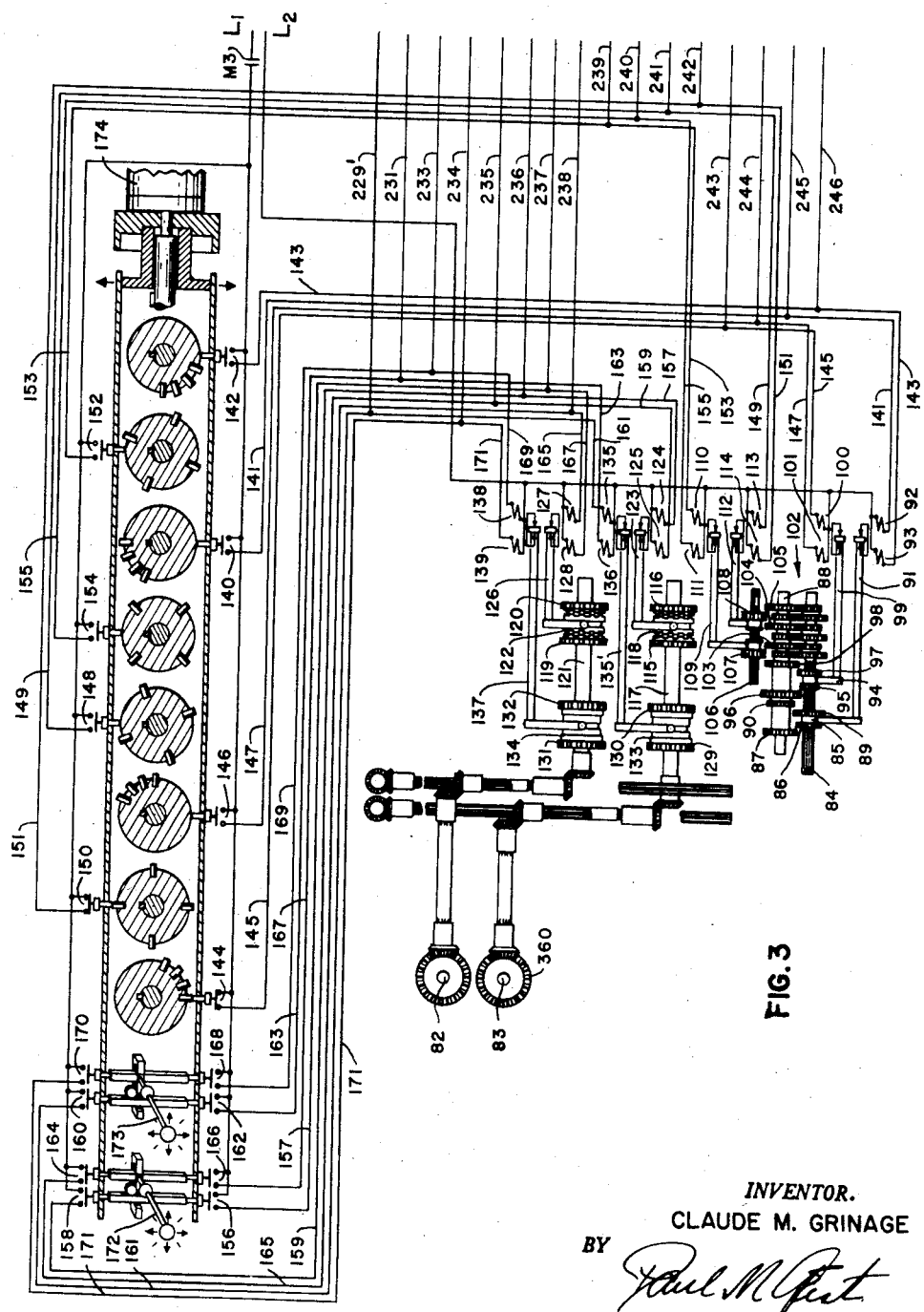
Fig. 3 is a schematic view of the feedworks and pendant control therefor.

Referring to Figs. 1 and 3, the motion of the head $H_m$ horizontally and vertically is adapted to be effected by the rotation of a splined shaft 82 and a screw 83. The spline 82 and the screw 83 correspond to the spline 93 and the screw 91, respectively, of the above-identified patent application in the name of E. C. Bullard et al. As was specifically described in the above-referred-to patent application, the splined shaft and screw are adapted to be rotated in either direction at a relatively rapid traverse rate and at 16 different relatively slow feed rates. Furthermore, as specifically described in said application, the power for driving the feedworks transmission is derived from the headstock transmission shown in Fig. 2 so that the motion of the head $H_m$ is proportional to the rotation of the work-supporting table W.

Referring to Fig. 3, portions of the feedworks transmission of the above-referred-to patent application of E. C. Bullard et al. are shown diagrammatically and include an input shaft 84 that is adapted to be supplied with power from the output shaft 40 of the headstock transmission of Fig. 2 as specifically shown and described in the above-referred-to patent application. Accordingly, each speed at which the output shaft 40 of the headstock $T_h$ is adapted to be rotated will provide a corresponding speed of rotation of the input shaft 84 of the feedworks shown in Fig. 3. A gear cluster 85 is splined to the shaft 84 and is adapted to be moved leftwardly to provide a meshing relationship between a gear 86 of the gear cluster 85 and a spur gear 87 fixed to a shaft 88. Rightward movement of the gear cluster 85 is adapted to effect meshing relationship between a gear 89 of the cluster 85 and a gear 90 fixed to the shaft 88. A draw bar 91 is connected to the cluster 85 and is adapted to be moved leftwardly and rightwardly by the energization of solenoids 92 and 93, respectively.

Another gear cluster 94 is splined to the shaft 84 and it includes a gear 95 adapted to mesh with a gear 96 fixed to the shaft 88. The cluster 94 also includes a gear 97 that is adapted to be meshed with a gear 98 fixed to the shaft 88. The cluster 94 is attached to a draw bar 99 that is adapted to be moved leftwardly and rightwardly by the energization of solenoids 100 and 101, respectively.

A speed reduction unit 102 is provided between the shafts 84 and 88 in the same manner as the speed reduction unit 160 is provided in the above-referred-to patent application. This speed reduction unit includes a train of gears including gears 103, 104 and 105, all as more fully disclosed in the above-referred-to patent application. An additional shaft 106 is mounted in parallel relation with the shaft 88 and it has splined on it two gears 107 and 108. Leftward movement of the gear 107 will cause it to enmesh with the gear 98, while rightward movement of the gear 107 will cause it to enmesh with the gear 103. Leftward movement of the gear 108 will cause it to enmesh with the gear 104, while rightward movement of the gear 108 will cause it to enmesh with the gear 105. The gear 107 has a draw bar 109 attached to it which is adapted to be moved leftwardly and rightwardly by the energization of solenoids 110 and 111, respectively. The gear 108 is provided with a draw bar 112 that is adapted to be moved leftwardly and rightwardly by the energization of solenoids 113 and 114, respectively.

From the foregoing, it is evident that 16 different rates of rotation of the shaft 106 can be effected by the selective energization of the solenoids 92, 93, 100, 101, 110, 111, 113 and 114. As was described in the above-referred-to patent application, the shaft 106 is adapted reversely to drive gears 115 and 116 journaled on a shaft 117, to the latter of which is splined a clutch member 118. The gears 115, 116 actually are maintained in meshing relation with corresponding gears 119 and 120 journaled on a shaft 121 parallel to the shaft 117, but are shown separated for clarity. A clutch 122 is splined to the shaft 121 between the gears 119 and 120. Since the gears 115 and 116 rotate in opposite directions, the gears 119 and 120 also rotate in opposite directions. The clutch 118 is provided with a draw bar 123 that is adapted to be moved leftwardly and rightwardly by the energization of solenoids 124 and 125, respectively. The clutch 122 is provided with a draw bar 126 that is adapted to be moved leftwardly and rightwardly by the energization of solenoids 127 and 128, respectively. The shafts 117 and 121 also include gears 129, 130, 131 and 132. The gears 131 and 129 are in meshing relation and the gears 132 and 130 are in meshing relation as described in the above-referred-to application. The gears 129 and 130 are adapted to be rotated in opposite directions by a drive originating at the input of the headstock, and taken off from the gear 10 (Fig. 2). A clutch 133 is provided between the gears 129 and 130 and a clutch 134 is provided between the gears 131 and 132. A draw bar 135' is connected to the clutch 133 and it is adapted to be moved leftwardly and rightwardly by the energization of solenoids 135 and 136, respectively. A draw bar 137 is connected to the clutch 134 and it is adapted to be moved leftwardly and rightwardly by the energization of solenoids 138 and 139, respectively. The shafts 117 and 121 are connected, respectively, to screw 83 and splined shaft 82 through suitable gearing and shafting as described in the above-identified patent application of E. C. Bullard et al.

From the foregoing it is evident that the screw 83 and the spline 82 can be rotated in either direction at any one of 16 different feed rates, or at a relatively rapid traverse rate of speed by the selective energization of the various solenoids 92, 93, 100, 101, 110, 111, 113, 114, 124, 125, 135, 136, 127, 128, 138 and 139.

As specifically disclosed, shown and claimed in the above-referred-to patent application of E. C. Bullard et al., the control of the feedworks transmission shown in Fig. 3 is also adapted to be effected by apparatus contained within the pendant P, and which latter structure is shown schematically in Fig. 3. Each of the above-mentioned solenoids that controls the shifting of the various gears and clutches in the feedworks has its one side connected to the line L2. A switch 140 has its contact connected to line L1 and its other contact connected to a conductor 141 leading to the side of solenoid 92 opposite that which is connected to the line L2. A switch 142 has its one contact connected to line L1, and its other contact connected to a conductor 143 leading to the side of solenoid 93 opposite that which is connected to the line L2. A switch 144 has its one side connected to line L1 and its other side connected to a conductor 145 leading to the one side of the solenoid 100 opposite that which is connected to the line L2. Another switch 146 has its one side connected to line L1 and its other side connected to a conductor 147 leading to the one side of the solenoid 101 opposite that which is connected to the line L2.

A switch 148 has its one side connected to the line L1 and its other side connected to a conductor 149 leading to the one side of solenoid 113 opposite that connected to the line L2. Another switch 150 has its one side connected to the line L1 and its other side connected to a conductor 151 leading to the one side of the solenoid 114 opposite that which is connected to the line L2. Another switch 152 has its one side connected to the line L1 and its other side connected to a conductor 153 leading to the one side of the solenoid 110 opposite that which is connected to the line L2. Another switch 154 has its one side connected to the line L1 and its other side connected to a conductor 155 leading to the one side of solenoid 111 opposite that which is connected to the line L2.

Another switch 156 has its one side connected to line L1 and its other side connected to a conductor 157 leading to the one side of solenoid 124 opposite that which is connected to the line L2. A switch 158 has its one end connected to line L1 and its other end connected to a conductor 159 leading to the one side of solenoid 125 opposite that which is connected to the line L2. Another switch 160 has its one side connected to the line L1 and its other side connected to a conductor 161 leading to the one side of solenoid 135 opposite that which is connected to the line L2. Another switch 162 has its one side connected to the line L1 and its other side connected to a conductor 163 leading to the side of the solenoid 136 opposite that connected to the line L2. A switch 164 has its one end connected to the line L1 and its other side connected to a conductor 165 leading to the one side of the solenoid 127 opposite that connected to the line L2. A switch 166 has its one side connected to the line L1 and its other side connected to a conductor 167 leading to the side of solenoid 128 opposite that connected to the line L2. Another switch 168 has its one side connected to the line L1 and its other side connected to a conductor 169 leading to the side of solenoid 138 opposite that connected to the line L2. Finally, a switch 170 has its one side connected to the line L1 and its other side connected to a conductor 171 leading to the side of solenoid 139 opposite that connected to the line L2.

Pivotally-mounted hand levers 172 and 173 are provided with cooperating linkages to effect the selective closing of the switches 158, 164, 160, 170, 156, 166, 162 and 168 to cause the directional movement of the head $H_m$, all as more fully described in the above-referred-to patent application in the name of E. C. Bullard et al. Also, a hand wheel 174 is provided for rotating the cam sections having dogs effective to operate the switches 150, 148, 154, 152, 144, 146, 140, and 142 in a manner to provide the 16 different rates of rotation of the spline 82 and the screw 83 as described in said patent application.

Figure 4:
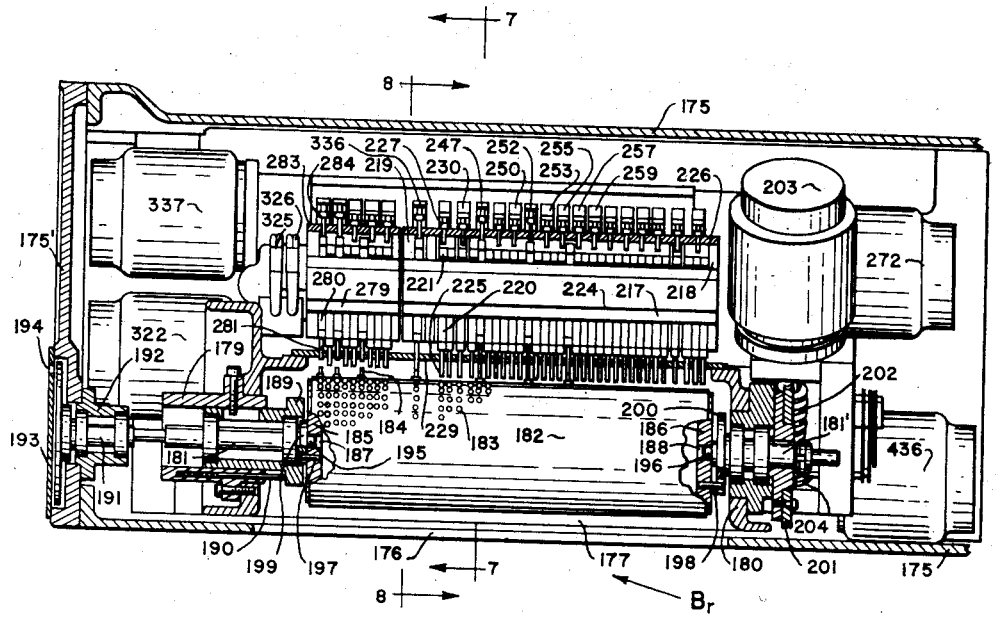
Fig. 4 is a sectional plan view taken substantially along line 4—4 of Fig. 1.

From the foregoing, it is evident that the structure so far described comprises a headstock and feedworks transmission for rotating the table W and for linearly moving the head $H_m$, and one which is adapted manually to be controlled from the pendant P, which latter can be moved to any position of convenient access to an operator. One of the principal objects of the present invention is to provide a removable attachment for the machine shown in Fig. 1 which can be pre-set to cause the table W to rotate at any one of its 20 speeds and the head $H_m$ to move along either of its paths of motion at any one of 16 different speeds or at a rapid traverse rate in accordance with the predetermined program. Referring to Fig. 4, the bracket $B_r$ includes a housing 175 having an opening 176 in its front or outer longitudinal surface adapted to be closed by a hinged door. The housing 175 is provided with a bracket 177 which supports bearings 179 and 180 in aligned spaced relation. Shafts 181 and 181' are journaled in the bearings 179 and 180, respectively, and support between them a tubular drum 182 having peripherally arranged about its outer surface at equal intervals, linearly-disposed rows of threaded holes 183 adapted to receive dogs 184. The tubular drum 182 is provided with end walls 185 and 186 having axially aligned holes 187 and 188 in the centers thereof. The shaft 181 is mounted within a reciprocal housing 189 that is urged rightwardly (Fig. 4) by a spring-pressed detent 190. The left-hand end of the shaft 181 is provided with a sliding key connection to a tubular shaft 191 mounted in a bearing 192 supported in the end plate 175' of the housing 175. A disc 193 is fixed to the tubular shaft 191 and is provided with indices viewable through a window 194 of the end plate 175' of the housing 175 for indicating the axially disposed row of holes 183 that is effective at any given time.

The shaft 181 is provided with a trunnion 195 that extends into the opening of the hole 187 within the left-hand end disc 185 of the drum 182. The shaft 181' is journaled in the bearing 180 as above-described and also includes a trunnion 196 that extends into the hole 188 of the disc 186 forming the right-hand end wall of the drum 182. Locating dogs 197 and 198 are fixed to the end walls 185 and 186, respectively, of the drum 182 and are adapted to cooperate with slots formed in discs 199 and 200 that are fixed to the shafts 181 and 181', respectively. The construction and arrangement of the drum 182 and its mounting are such that it may be preset with dogs 184 away from the attachment. Simply by moving the shaft 181 leftwardly (Fig. 4), the drum 182 may be inserted on the trunnions 195 and 196. When the dogs 197 and 198 are in proper cooperation with their corresponding slots in the discs 199 and 200, the drum 182 will be in the proper position relatively to the indices on the disc 193 and the drive shaft 181', to be described later. This construction makes it possible to store pre-set function drums 182 for various jobs thereby facilitating the easy conversion of the machine tool from one automatic cycle to another.

Referring again to Fig. 4, a worm gear 201 is keyed to the shaft 181' and is in mesh with a worm 202 fixed to the output shaft of a synchronous motor 203, the operation of which is adapted to be controlled by a cam 204 on the end of the worm 202 by cooperating with certain electrical switches to be described later.

Figure 7:
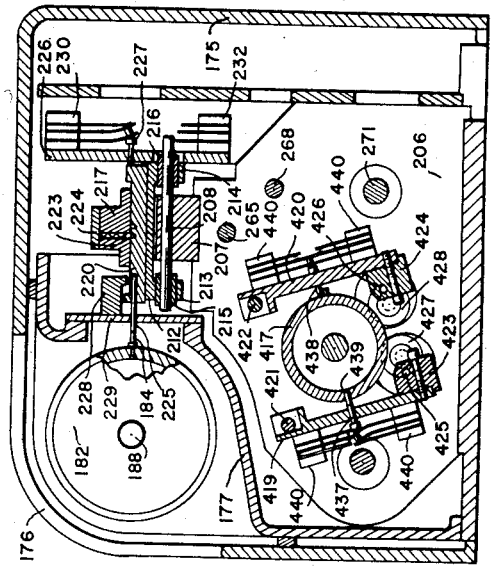
Fig. 7 is a sectional elevational view taken substantially along line 7—7 of Figs. 4, 5 and 11.

Referring to Figs. 7 and 11, brackets 205 and 206 are mounted in spaced relation within the housing 175 and rigidly support at their upper ends a block 207. Cylindrical guide-ways 208 and 209 are mounted within the block 207 and are fixed thereto by set screws 210 and 211. Referring specifically to Fig. 7, a finger-supporting plate or shuttle 212 is provided with ears 213 and 214 containing bearing bushes 215 and 216 in aligned relation for each of the guides 208 and 209. The construction and arrangement of the parts are such that the support or shuttle 212 is adapted to be slidingly mounted on the cylindrical guide-ways 208 and 209.

Figure 6:
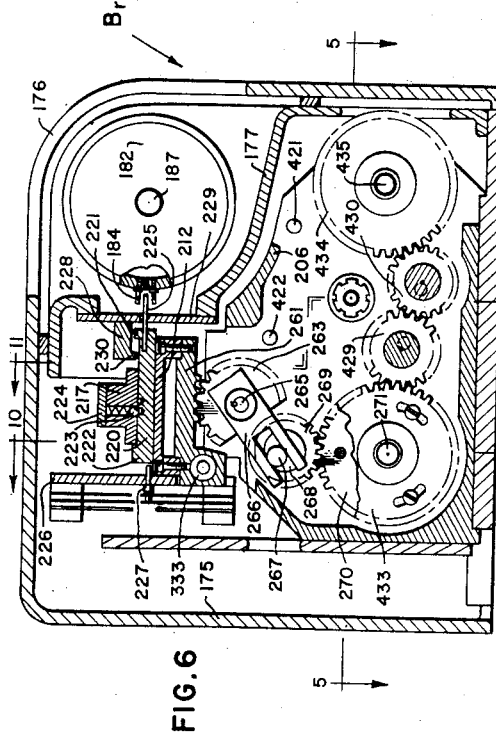
Fig. 6 is a sectional elevational view taken substantially along line 6—6 of Fig. 5.

Referring to Figs. 7 and 11, a cap member 217 is fixedly mounted on the top of supporting plate 212 and is supported by upstanding end portions 218 and 219 of the supporting plate 212. Between the upstanding portions 218 and 219 of the supporting plate 212 is located a plurality of switch-actuating fingers 220, substantially all of which are alike and, therefore, only one will be described specifically. Referring to Fig. 6, it comprises a rectangularly cross-sectioned member having an upstanding ear portion 221 at its one end and another ear portion 222 at its other end. The fingers 220 are mounted on the support 212 side by side for individual sliding motion between the support 212 and the cap portion 217. Spring pressed balls 223 are mounted within the cap portion 217 above each of the fingers 220 and are held therein by a cover plate 224. One of the spring pressed balls 223 is adapted to cooperate with notches in the finger 220 to locate it in either its forward or rearward positions. The one end of the fingers 220 is provided with a rod 225 adapted to cooperate with the dogs 184 on the drum 182.

A switch supporting plate 226 is fixedly mounted on the finger supporting element 212 and it is adapted to support a switch for each of the fingers 220. In the embodiment shown, there are 33 separate fingers 220 and, accordingly, 33 separate electrical switches on the switch supporting plate 226, each of which cooperates with its corresponding finger. Seventeen of the 33 switches are located on the upper portion of the switch supporting member 226, while sixteen of the switches are located on the lower end of the supporting member 226. The supporting plate 226 is provided with pins 227 in line with each of the 33 switches and its corresponding finger 220. A neutralizing bar 228 is rigidly fixed to a shield plate 229 and is provided with a depending edge 230 that is adapted to cooperate with the ears 221 of the fingers 220. The construction and arrangement of the parts are such that reciprocation of the finger supporting plate 212 on the cylindrical guides 208 and 209 causes the ears 221 of the fingers 220 to engage the depending edge 230, thereby retracting all of the fingers 220 that may be in engagement with corresponding pins 227 in the plate 226. When this occurs, spring pressed ball 223 becomes located in the depression corresponding to the neutral position of the finger 220 where it remains until a forward movement of the support 212 is effected. When support 212 is moved forwardly, a rod 225 of a finger 220 contacts a dog 184 on a drum 182 to thereby force the finger into engagement with its corresponding pin 227 to thereby close its corresponding switch on the back of the switch supporting plate 226.

Referring to Figs. 3 and 21, the conductor 161 for the solenoid 135 is connected to a line 229' leading to a switch 230' mounted on the back of the switch-supporting plate 226 (Fig. 6). The conductor 163 for solenoid 136 is connected to a line 231 leading to a switch 232, likewise mounted on the back of the plate 226. In the same way, conductors 169, 171, 159, 157, 167, 165, 153, 155, 149, 151, 145, 147, 141 and 143 are connected to lines 233, 234, 235, 236, 237, 238, 239, 240, 241, 242, 243, 244, 245, 246, respectively, which lead to switches 247 to 260, inclusive, all of which latter switches are located on the back of the switch supporting plate 226.

For the purpose of reciprocating the finger supporting plate 212 to cause cooperation between the fingers 220 thereon and the dogs 184 on the drum 182, as well as the switches on the back of the switch supporting plate 226, racks 261 and 262 (Fig. 11) are fixed to the bottom surface of the supporting plate 212. The rack 261 meshes with a fragmentary gear 263, while the rack 262 meshes with a gear 264, the latter two gears being keyed to a shaft 265 mounted in bearings within the brackets 205 and 206 within the housing 175. Also keyed to the shaft 265 is a bifurcated lever 266 (Fig. 6), the bifurcated portion of which cooperates with a pin 267 eccentrically mounted on a shaft 268 that is likewise mounted in bearings within the brackets 205 and 206. The shaft 268 also supports in fixed relation a gear 269 that meshes with a gear 270 keyed to a shaft 271 (Fig. 10) also mounted in bearings within the brackets 205 and 206. The shaft 271 is connected to a synchronous motor 272 so that the gear train can be driven in a manner to effect oscillatory motion of the bifurcated link 266 and, consequently, reciprocative motion of the finger supporting plate 212. From the foregoing, it is evident that energization of the synchronous motor 272 will effect the reciprocation of the finger supporting carriage 212 to cause the fingers 220 thereon to cooperate with the dogs 184 on the drum 182 as well as with the neutralizing bar 228 and the switches on the back of the switch supporting plate 226.

Figure 9:
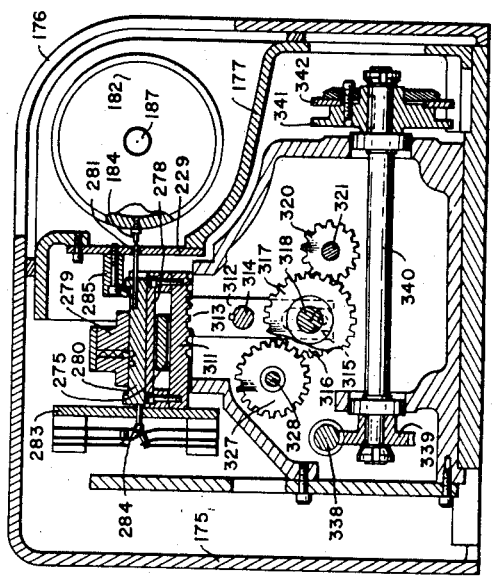
Fig. 9 is a sectional elevational view taken substantially along line 9—9 of Fig. 11.

The structure which has just been described within the housing 175 effects the control of the feedworks transmission to determine the direction and rate of motion and path along which the head $H_m$ is adapted to be moved automatically. Also located within the housing 175 is a control apparatus for automatically determining the rate of rotation of the work-supporting table W. Referring to Figs. 10 and 11, brackets 273 and 274 are rigidly mounted within the housing 175. A block 275 is fixed to the top of the brackets 273, 274 and is adapted rigidly to support cylindrical guide bars 276 and 277. Referring to Fig. 9, a finger supporting member or shuttle 278 is mounted for free reciprocation on the guide bars 276 and 277 in the same manner as the plate or shuttle 212 is mounted for reciprocation on the guide bars 208 and 209. Likewise, a cap member 279 (Fig. 11) is mounted on the supporting plate 278 and a series of fingers 280 are located side by side in relative sliding relationship between the plate 278 and the cap 279 in the same manner that the fingers 220 are adapted to be mounted between the plate 212 and the cap 217. The fingers 280 are each provided with a bar 281 that is adapted to extend through an aperture in a shielding plate 229 and in line with dogs 184 on the drum 182. Additionally, the support 278 is adapted to have fixed to it a switch mounting plate 283 similar to the plate 226. Pins 284 are adapted to extend through apertures in the plate 283 in line with the fingers 280 in the same way that the pins 227 extend through the plate 226 in line with the fingers 220. Reciprocation of the supporting plate 278 is adapted to cause the switches on the back of the plate 283 to be opened and closed in accordance with the cooperation between them and the rods 281 and dogs 184 on the drum 182. A neutralizing plate 285 is attached to the plate 229. It is similar to, and functions in the same manner as the bar 228 of Fig. 6.

Referring to Figs. 2 and 21, the conductor 62 is connected to a line 287 leading to a switch 288. Likewise, conductors 289, 65, 290, 291, 66, 292, 293 and 294 are respectively connected to conductors 295 to 302, respectively, which latter conductors lead respectively to switches 303 to 310, both inclusive (Fig. 21). The conductors 62, 289, 65, 291, 292, 294, 290, 66 and 293 lead from the various switches within the pendant P to the solenoids 45, 46, 37, 49, 19, 16, 36, 18 and 15 that control the operation of the headstock transmission, all as more fully described in the above-referred-to patent application of E. C. Bullard et al.

Figure 5:
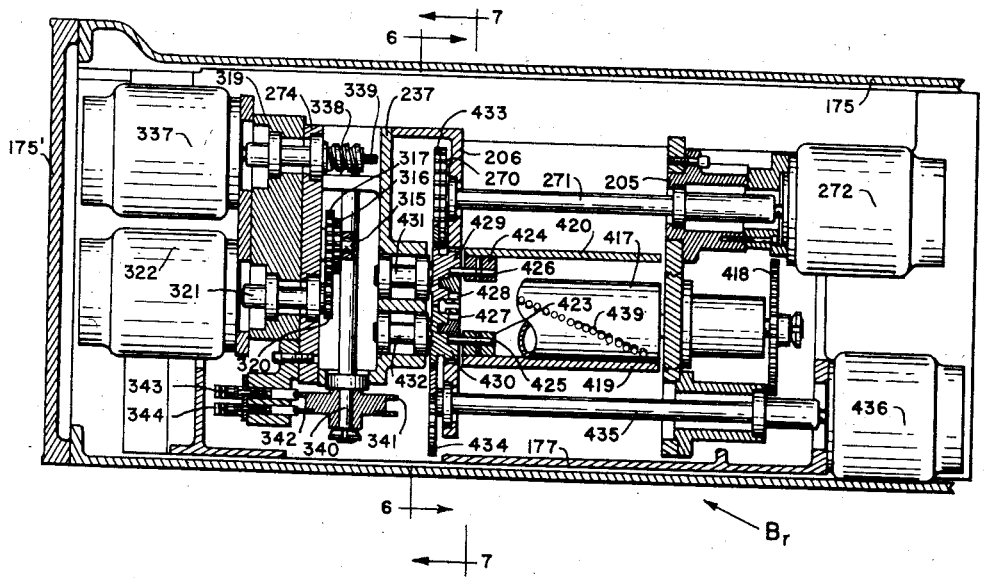
Fig. 5 is a sectional plan view taken substantially along line 5—5 of Fig. 6.

Referring to Figs. 9 and 11, the finger supporting plate 278 is fixed to a rack 311 in spaced relation as shown in Fig. 9 so that the reduced section of the block 275 passes between the space formed by the separated arrangement of the rack 311 and the finger supporting plate 278. A lever 312 is provided with teeth 313 that mesh with the teeth of the rack 311. This lever 312 is keyed to a shaft 314 journaled in bearings within the brackets 273 and 274 (Fig. 11). The lower end of the lever 312 is bifurcated and cooperates with a driving pin 315 that is eccentrically mounted on a spur gear 316. The spur gear 316 as well as an additional spur gear 317 are fixed to a shaft 318 that is journaled in the bracket 274 and a bearing housing 319 fixed thereto. Referring to Fig. 9, the spur gear 317 meshes with a pinion 320 that is fixed to a shaft 321. Shaft 321 is adapted to be rotated by a synchronous motor 322 (Fig. 5). Accordingly, rotation of the synchronous motor 322 causes the rotation of the eccentric pin 315 thereby oscillating the lever 312 to thereby cause the reciprocation of the rack 311 and with it the finger supporting plate 278. Also fixed to the shaft 318 are cams 323 and 324 that are adapted to operate electrical switches 325 and 326 for a purpose to be described later.

Figure 8:
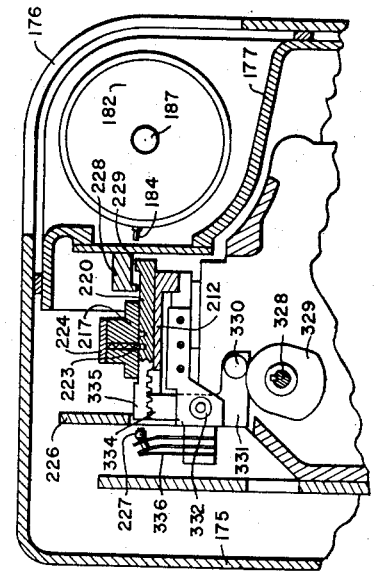
Fig. 8 is a partial sectional elevational view taken substantially along line 8—8 of Figs. 4 and 10.

Referring again to Fig. 9, the spur gear 316 is also adapted to mesh with a spur gear 327 that is keyed to a shaft 328 (Fig. 8) likewise journaled within the brackets 273 and 274 of the housing 175. The shaft 328 has fixed to it a cam 329 that is adapted to cooperate with a roller 330 on the one end of a bell crank lever 331 pivotally mounted in bearings 332 and 333 (Fig. 10). The end of the bell crank lever 331 opposite that containing the roller 330 is provided with teeth 334 adapted to mesh with corresponding teeth on a rack 335 that forms a special key within the group of fingers 220 for controlling the specific actuation of a switch 336, all for a purpose to be described later.

Referring to Fig. 5, an additional synchronous motor 337 is adapted to drive a worm 338 that meshes with a worm gear 339 (Fig. 9) keyed to a shaft 340. Two cams 341 and 342 are fixed to the shaft 340 for controlling the operation of electrical switches 343 and 344, respectively (Fig. 5), for a purpose to correlate the various operations of the mechanism previously described and which will become more apparent upon a description of the functioning of the apparatus.

Figures 13, 14:
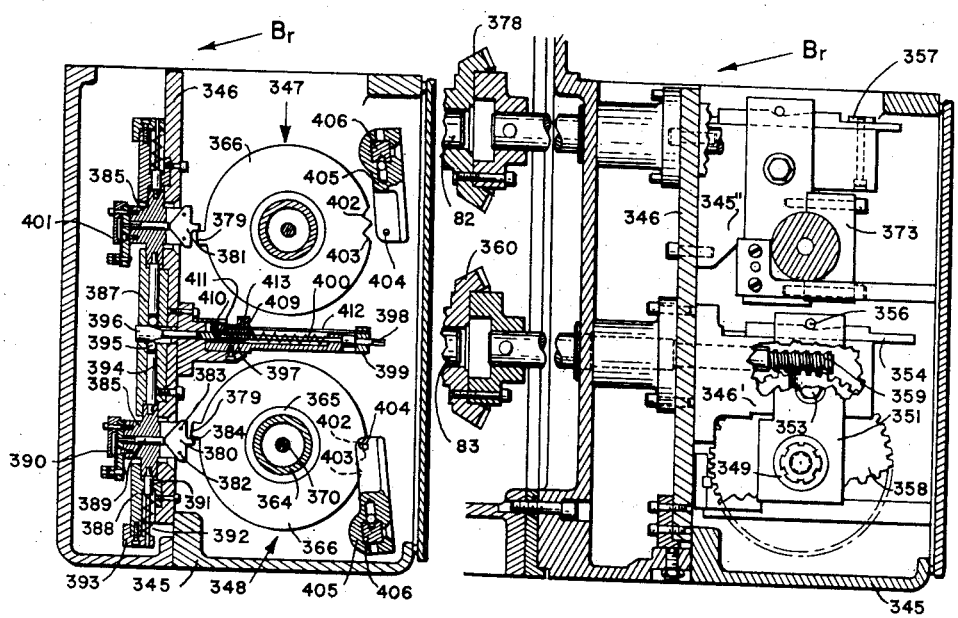
Fig. 13 is a sectional elevational view taken substantially along line 13—13 of Fig. 12.
Fig. 14 is a sectional elevational view taken substantially along line 14—14 of Fig. 12.
Figure 12:
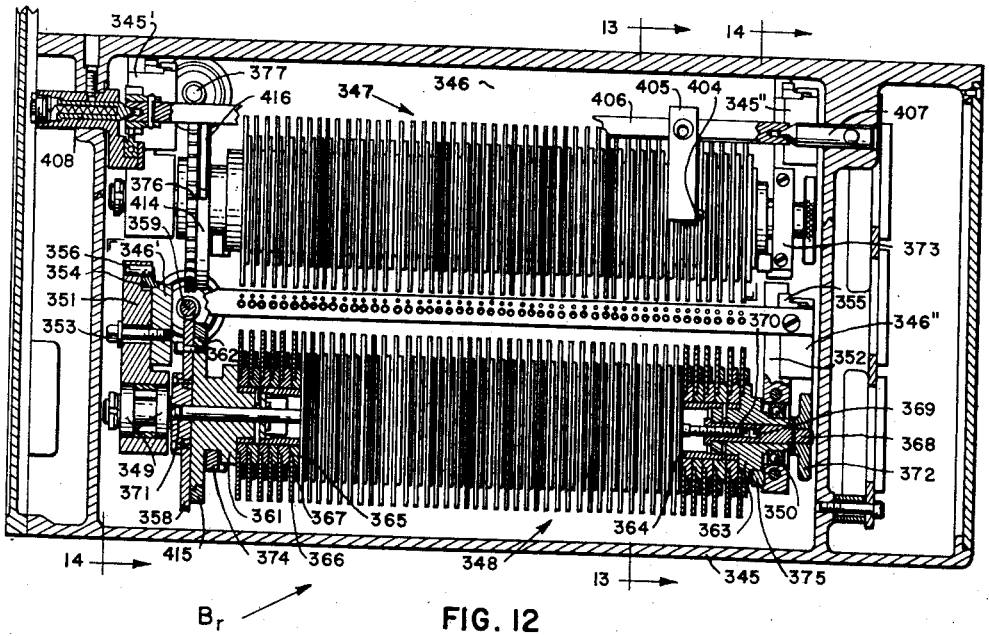
Fig. 12 is a partial sectional elevational view taken substantially along line 12—12 of Fig. 1.

The mechanism within the bracket $B_r$ that has been described relates to mechanism for effecting the programming of functions of the machine tool as distinguished from the duration of said functions. Referring to Figs. 12, 13 and 14, the bracket $B_r$ is also adapted to support mechanism for determining the duration of operation of any of the functions set up on the function drum 182. An additional housing 345 fixed to the housing 175 is adapted to include brackets 345' and 345" that are rigidly bolted to an intermediate wall 346 within said additional housing. Another pair of brackets 346' and 346" is likewise bolted to the intermediate wall 346 and both sets of brackets 345', 345" and 346', 346" are adapted to support drum-like members 347 and 348 of substantially identical construction. Referring to Fig. 12, the drum 348 is mounted in bearings 349 and 350 within arms 351 and 352 pivotally, adjustably attached to the brackets 346' and 346" by pivot bolts 353 (only one of which is shown). The arms 351 and 352 are supported on track members 354 and 355 slidably supported by the brackets 346' and 346" and adapted to be locked in adjusted position. The engagement between the arms 351, 352 and the slidable ways 354, 355 is through the agency of pins 356, only one of which is shown in Fig. 12. The locking of the slidable ways 354 and 355 is effected by lock nut and bolt constructions similar to that shown at 357 (Fig. 14), all for a purpose to be described later.

Referring to Fig. 12, a worm gear 358 is fixed to the journal of the bearing 349 within the bracket 351 and meshes with a worm 359 that is coupled to a bevel gear 360 (Fig. 14). The bevel gear 360 is keyed to the screw 83 (Figs. 1 and 3). Referring again to Fig. 12, a hub member 361 is bolted to the worm gear 358 in a manner such that it can be removed and replaced in a fixed definite rotative relationship with respect to the gear 358. The locating means comprises a stripper bolt 362. Another hub-like member 363 is journaled in the bearing 350 within the right-hand bracket 346" (Fig. 12). A tubular shaft 364 is located between the hub members 361 and 363, and it supports in side-by-side relationship a ring member 365 for each of the horizontally-disposed, peripherally-spaced rows of openings 183 within the drum 182 (Fig. 4). Each of the ring members 365 is provided with a peripheral recess adapted to receive a detector ring 366, and a peripherally-threaded portion adapted to receive a locking ring 367. The construction and arrangement of the rings 365 and 366 are such that the rings 366 are free to turn relatively to the rings 365, but rotation of the rings 367 will cause the threads supporting the latter to lock the detector rings 366 in any predetermined angular position. A rotatable shaft 368 is located axially of the hub member 363 and it is provided with a threaded recessed portion 369. A shaft 370 is threaded into the recess 369 and extends throughout the length of the tubular member 364. It is received by an axial opening in the hub member 361 in registry with a recess 371 in the journal of the bearing 349. A knurled hand wheel 372 is pinned to the shaft 368, and the construction and arrangement of the parts are such that rotation of the knurled handle 372 in one direction causes the shaft 370 to move axially from within the recess 371 rightwardly (Fig. 12) until it clears the right-hand surface of the worm gear 358. In this condition of the apparatus, the threaded portion of the shaft 370 bottoms in the threaded cavity 369. A bearing cap 373 can be removed from the bearing 350 and the screws that hold the hub member 361 to the gear 358 may also be removed. Continued rotation of the knurled hand wheel 372 will cause the drum 348 including the hub members 361 and 363 together with all of their pre-adjusted detector discs 366 to move outwardly from the housing 345 along two track members 374 and 375 so that when a job is completed, the drum 348 may be stored until it is necessary to repeat the operation of the machine in accordance with the pre-set condition of that particular drum.

The drum 347 within the housing 345 is substantially identical to the drum 348 and it is adapted to be rotated by a worm gear 376 that meshes with a worm 377. The worm 377 is coupled to a bevel gear 378 (Fig. 14) which latter is keyed to the rotatable spline 82 (Figs. 1 and 3).

Referring to Fig. 13, each of the detector discs 366 is provided with a switch-actuating dog 379 that is adapted to cooperate with switch actuators 380 and 381. There is a switch actuator 380 for each of the discs 366 on the drum 348; and, there is a switch actuator 381 for each of the discs 366 on the drum 347. The switch actuators 380 and the corresponding switch structure thereof are substantially the same in principle as that shown, described and claimed in Patent 2,623,970 in the name of E. P. Bullard III, et al., to which patent reference is directed for specific constructional features not fully shown in this application. The actuator 380 includes two pins 382 and 383 about which it will pivot in a manner described in the above-referred-to patent. The actuator also includes a protruding portion 384 in line with the actuating dogs 379 on the disc 366. The pivotal mounting for the actuator 380 is rigidly fixed to a body 385 of a switch, which latter is vertically-slidable (Fig. 13) within ways formed in a backing plate 346 and cooperating plates 387 and 388 to be described later. The actuator 380 when pivoted about the pins 382 and 383 due to its cooperation with the dog 379 on the disc 366 causes a cylindrical plunger 389 within the body 385 to move leftwardly (Fig. 13) to thereby effect the closing of a detector switch 390. A pin 391 fixed to the lower portion of the body 385 cooperates with a compression spring 392 that is backed against a cap member 393 fixed to the cooperating plate 388. The construction is such that the compression spring 392 continually urges the body 385 vertically upwardly. Another pin 394 is fixed to the upper portion of the body member 385 and it extends through a cylindrical passage within the cooperating plate 387, into supporting relation with a ball bearing 395. A reciprocable plunger 396 is maintained at right angles to the pin 394 and is provided with a cam surface in cooperating contact with the ball bearing 395. The plunger 396 includes a stem portion 397 that threadingly receives a micrometer screw 398 that is rotatably but non axially-movably supported within bearings formed in the outer end of a supporting plate 399. The outer end of the micrometer screw 398 is squared to facilitate its being turned by a tool. A compression spring 400 is located between the end of the plunger 396 that is threaded to the micrometer screw 398 and one of the bearings at the end of the support 399. The construction and arrangement of the parts are such that rotation of the micrometer screw 398 will cause horizontal reciprocation of the plunger 396 to thereby cause the cam surface on the plunger 396 to force the rod 394 downwardly or permit it to move upwardly under the influence of the compression spring 392. The construction of the cam surface on the plunger 396 is such that five-thousandths of an inch axial movement of the plunger 396 effects one-thousandth of an inch vertical movement of the switch body 385.

An identical switch body 385 is provided for the actuator 381. The actuator 381 is adapted to effect the closing of another detector switch 401. Not only will the switch including the actuator 380 be adjusted by the rotation of the micrometer screw 398, but from an inspection of Fig. 13, it is obvious that a like adjustment simultaneously will occur to the switch including the actuator 381.

From the foregoing, it is evident that each of the corresponding detector discs 366 on the drums 347 and 348 have corresponding switch actuators 380 and 381 that control the operation of corresponding detector switches 390 and 401, and that simultaneous adjustment of the corresponding switches can be effected by the rotation of the corresponding micrometer screw 398. The head $H_m$ is moved along only one of its paths at a time, except in rare instances when it is moved along a 45° path by the simultaneous engagement of horizontal and vertical feed. This makes it feasible to adjust simultaneously both switches 385 for the drums 347 and 348 since only one will be effective at a time. In the case of movement of the head $H_m$ along the 45° path, the disc 366 on either drum 347 or 348 may be used to control, but the other must be in a position not to interfere with its switch 385.

Furthermore, since all of the discs 366 of the drum 347 are movable by the rotation of the splined shaft 82 of Fig. 1, they are adapted to control the vertical movement of the head $H_m$; and, since all of the discs 366 on the drum 348 are rotated by the screw 83, they are adapted to control the horizontal movement of the head $H_m$. Since the head $H_m$ is adapted to be moved in two directions along each of its paths of motion, it is obvious that the dogs 379 on the discs 366 will either have to be set on one or the other sides of the protuberances 384 of the actuators 380 and 381, depending upon the direction in which the head $H_m$ is adapted to be moved under the control of a specific disc 366. Accordingly, each of the discs 366 is provided with notches 402 and 403 which when they are in cooperation with a pin 404 they automatically locate the dog 379 on one or the other sides of the protuberance 384 of the actuator 380. The pin 404 is mounted on an arm 405 (Fig. 12) that is adapted adjustably to be moved along a rod 406. The rod 406 is adapted removably to be mounted between a center 407 and a spring-pressed center 408. The cooperation between the pin 404 and the notches 402 and 403 provides the rough adjustment of the discs 366, and rotation of the micrometer screw 398 thereafter effects the accurate adjustment of the closing of the switch 390. There is an identical arm 405 having an identical pin 404 mounted in cooperating relation with the discs 366 of the drum 347. The bars 406 supporting the arms 405 are adapted to be removed from their centers when the apparatus has been pre-set.

In order to determine the mid-point of adjustment of the switches 390 and 401, a so-called flush gage is employed. Referring to Fig. 13, it comprises a member 409 that is fixed to the plunger 396 by a pin 410. The pin 410 is adapted to be guided in a slot 411 formed in the support for micrometer screw 398. A wire rod 412 is axially adjustably fixed to the member 409 by a set screw 413, and it extends outwardly through a cylindrical opening within the supporting plate 399 for the micrometer screw 398. The adjustment of the wire rod 412 is such that its outer extremity is exactly flush with the rightwardmost portion of the supporting plate 399 when the switch bodies 385 are midway of their vertically-adjustable stroke.

An additional feature of the mounting for the drums 347 and 348 includes the discs 414 and 415 that are part of the hub portions 361 of each drum. These discs contain on their peripheries indices progressively numbered from each side of zero. Additionally, the rods 406 that support the locating arms 405 also are adapted to support fingers 416. The finger 416 for the disc 415 cooperates with the zero datum reading thereof when the head $H_m$ is in the center of the work supporting table W. The finger 416 for the disc 414 cooperates with a convenient datum for the vertical position of the head $H_m$ which may be at any given elevation above the table W for a given job, depending upon the location of the cross rail and the main head slide. Furthermore, this arrangement of the finger 416 and the discs 414 and 415 makes it possible accurately to replace from storage, a pre-set drum 347 or 348. All that is necessary is that the operator have the head $H_m$ at the center of the work table W when the horizontal drum 348 is inserted, and the finger 416 in cooperation with the zero index on the disc 415; and, the vertical position of the head $H_m$ at the previously determined datum when the zero index on the disc 414 is in line with the finger 416 for the drum 347. From the foregoing, it is evident that the rotation of the drums 347 and 348 will continuously and successively actuate all of the switches 390 and 401. However, only one of the discs 366 of each of the drums 347 and 348 represents one horizontally disposed row of openings 183 on the drum 182. It is necessary, therefore, to provide a current distributing means to insure energization of a circuit including the proper switches 390 and 401 corresponding to the correct row of openings 183 on the drum 182. Referring to Figs. 5, 7 and 11, a distributing drum 417 is mounted in bearings supported by the brackets 205 and 206 within the housing 175. Fixed to and rotatable with the drum 417 is a worm gear 418 that is adapted to mesh with the worm 202 (Fig. 4) of the main function drum driving mechanism. Referring to Fig. 7, switch supporting plates 419 and 420 are pivotally mounted on rods 421 and 422 that extend between the brackets 205 and 206 within the housing 175. The ends of the plates 419 and 420 opposite those pivotally mounted on the rods 421 and 422 are provided with blocks 423 and 424 that support pins 425 and 426. Referring to Fig. 5, the pins 425 and 426 extend into eccentrically arranged grooves 427 and 428 within gears 429 and 430. The gears 429 and 430 are fixed to shafts 431 and 432. The gears 429 and 430 are in meshing relation with each other, and the gear 429 is in mesh with a gear 433. The gear 430 meshes with a spur gear 434 that is fixed to a shaft 435 mounted in bearings within the brackets 205 and 206. Another synchronous motor 436 is adapted to drive the shaft 435 and its function is primarily to provide additional power to combine with the power from the motor 272 to overcome the load imposed by the shuttle moving mechanism as well as the operation of the pivotally mounted switch supporting plates 419 and 420. The gear 433 is adjustably fixed to the gear 270 (Fig. 6) to provide an angular adjustment between them to facilitate the proper timing of the gear train including gears 434, 430, 429, 433 and 270, driven by the synchronous motors 272 and 436.

The arrangement of the eccentric slots 427 and 428 is such that the switch supporting plates 419 and 420 pivot about their rods 421 and 422 so as to remove switch actuating plungers 437 and 438 from cooperating position relative to dogs 439 on the periphery of the drum 417 prior to an indexing motion of the drum 417 from one station to another. The dogs 439 on the drum 417 are arranged in two spirally arranged paths about the periphery of the drum 417 such that the developed form of the drum 417 will include these two paths as straight lines at 45° from the horizontal. The dogs 439 in one path are peripherally misaligned with the dogs 439 in the other path. This arrangement, therefore, insures that the dogs 439 in one path will cooperate with the plungers 437 in the support 419 while at the same time, the dogs 439 in the other path will not cooperate with the plungers 438 in the switch support 420; and, when the dogs 439 in the second path do cooperate with the plungers 438 in the switch support 420, the corresponding dogs 439 in the first path do not cooperate with the plungers 437 in the switch support 419. Switches 440 are arranged on the supports 419 and 420 so that they cooperate with corresponding plungers 437 and 438. There is a switch 440 for each of the dogs 439 and it is arranged in series relation with respect to the corresponding switches 390 and 401 (Fig. 13) for each of the discs 366 on each of the drums 347 and 348.

From the foregoing, it is evident that each index position of the function drum can provide a selection of any of the functions of the head $H_m$ and that a corresponding disc 366 for both horizontal and vertical movement will be rendered effective only when the function drum 182 is at its corresponding index position. Furthermore, this phase relation between each index position of the function drum 182 and the energization of its corresponding discs 366 for vertical and horizontal motion is maintained at all times.

Figure 15:
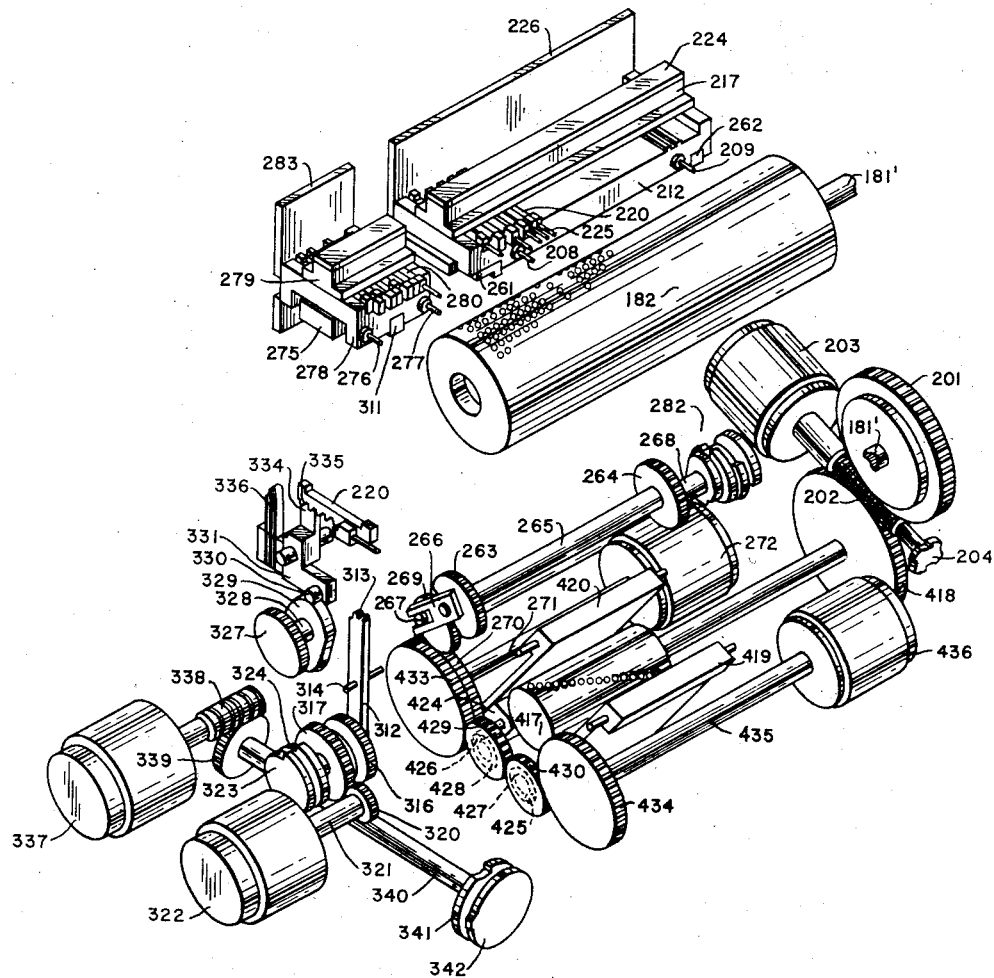
Fig. 15 is an exploded view in perspective of the essential elements within the bracket $B_r$ of Fig. 1.

A brief description of the cycle of operation of the apparatus shown in Fig. 15 will be first given, followed by a detailed description thereof taken with the electrical diagram of Fig. 21.

Briefly, the cycle of operation of the apparatus to select a new function of head $H_m$ is initiated by the energizing of the motors 272 and 436 upon the closing of a detector switch. These motors begin the rearward movement of the shuttle or finger support 212 and the outward movement of the distributor switch-supporting plates 419 and 420 away from the distributor 417. They also begin the rotation of the cam 282. When the shuttle or finger support 212 has moved rearwardly sufficiently to have the dogs 184 on drum 182 clear the rods 225 on the fingers 220, the motor 203 is energized by cam 282. Energizing motor 203 starts the indexing of the drum 182 and the distributor 417. As the shuttle 212 moves forwardly, the fingers 220 thereon cooperate with the dogs 184 at the new indexed position of the drum 182 to establish the new function of the head $H_m$. The duration of this new function will, of course, be determined by the new indexed position of the distributor 417 which selects the corresponding pre-set detector shown in Fig. 12.

The headstock shuttle or finger support 278 reciprocates only when a headstock selection is desired and the fingers on the headstock finger support 278 do not interfere with dogs on drum 182 since this shuttle or finger support normally remains in a position midway between its forward and rearward positions. When a dog 184 is placed on the drum 182 for initiating a new headstock speed, it will be in line with a finger 220 on support 212, and upon the next forward movement thereof the dog will effect closing of switch 336 as shown in Fig. 16. Closing switch 336 starts motor 337, and the cam 342 driven by motor 337 will start the motor 322 in proper timed relation. As motor 322 rotates it will reciprocate support 278 through the action of arm 312 to effect the new headstock speed. As motor 337 continues to rotate, the cam 341 will open switch 343 (Fig. 19) to stop motor 337. As cam 324 completes its revolution it opens switch 326 (Fig. 20) thereby stopping motor 322.

The detailed description of the apparatus will include numerals in parentheses. These numerals refer to those on the left- and right-hand sides of Fig. 21.

In automatic run, lever 441 on housing 175 (Fig. 1) is in its upper position closing all A switches (15, 20, 24, 25, 29, 56, 58, 60 and 61); and opening switches M1 (12), M2 (22) and M3 (40). With lever 441' in its upper position, all MS switches (65, 67, 69 and 70) are opened.

Closing the main switch Z (Fig. 21) provides a voltage across lines L1 and L2; consequently, CR1 relay (11) is energized. Energization of CR1 relay causes closing of CR1 switch (9). Closing start switch (7, 9) causes relay 2M (7) and relay 1M (9) to become energized. Energization of these relays closes the 2M switches and the 1M switches in the circuits for the coolant motor 2M and the main motor 1M. Energization of these relays 2M (7) and 1M (9) also effects closing of the holding switches 2M (8) and 1M (10).

When a voltage is applied across lines L1 and L2, a transformed voltage is impressed across the rectifier R (12), thereby supplying direct current to the DCCR relay (19). Energization of the DCCR relay closes the DCCR1 switch (10).

As the pressure in the system builds up, pressure switch LPS (12) closes, energizing the CR2 relay (12), which latter closes the CR2 switch (10). Accordingly, the main motor relay 1M (9) is held energized after the start switch (7, 9) is released.

Let it be assumed that the apparatus has been pre-set automatically to perform a cycle of operations, and that a function is being performed by head $H_m$. At the completion of the function of the head H_m, a detector switch 390 or 401 (35 to 51) will close thereby energizing FCR and SCR relays (21, 23), the latter of which causes SCR1 switch (24) to open thereby deenergizing all of the solenoids 92, 93, 100, 101, 110, 113, 114, 124, 125, 127, 128, 135, 136, 138 and 139 (40 to 55) and, accordingly, stopping the function being performed by the head H_m.

Energization of the FCR relay (21) closes FCR2 switch (15), and since A3 switch (15) is closed in automatic run, motors 272 and 436 are energized to thereby start the movement of the function shuttle or finger support 212 (Fig. 15) from its forward position toward its back position, while at the same time starting the rotation of cam 282 (Figs. 10 and 15) that includes four parts for actuating switches HSM1 to HSM7. Immediately, switches HSM1 and HSM2 (16, 25; also, see Fig. 18) are closed by the corresponding part of cam 282 on shaft 268. Closing HSM1 switch holds the motors 272 and 436 energized after the distributor contact 440 is opened when the function drum 182 starts to index. Closing HSM2 switch holds relays SCR (23) and FCR (21) energized after HSM4 switch (27) opens, which occurs after 60° rotation of the corresponding part on cam 282. Relays SCR (23) and FCR (21) must remain energized during the indexing of the function drum 182; otherwise, the SCR1 switch (24) would close before the index of the drum 182 was completed thereby re-starting the function just completed.

During the first 95° rotation of the cam 282 on shaft 268, the function shuttle or finger support 212 will have caused cooperation between fingers 220 and the edge 230 of bar 228 (Fig. 6) to thereby move the fingers 220 away from their respective switches on the back of switch support 226 to clear the last function and permit indexing of drum 182 without interference between the dogs 184 thereon and the push rods 225 on the fingers 220.

After 95° rotation of the cam 282 on shaft 268, the HSM3 switch (20) is closed, and since the A4 switch (20) is closed in automatic run, motor 203 is energized starting the rotation of the worm 202 that indexes the function drum 182. The worm 202 is arranged such that 90° of its rotation indexes the function drum 182 from one station to the next succeeding station.

As soon as the worm starts to rotate, the cam 204 (Figs. 15 and 17) closes the CDM1 switch (18) which holds motor 203 energized after the HSM3 switch (20) opens which occurs at the end of the next 90° of rotation of the cam 282 (Fig. 18). (The cam 282 rotates at 150 R. P. M., whereas the cam 204 rotates at 75 R. P. M.) After 90° rotation of the worm 202 (one index station of function drum 182), the CDM1 switch (18) opens deenergizing its motor 203.

Continued rotation of the cam 282 beyond its first 90° of rotation and after the opening of the HSM3 switch (20), causes the subsequent opening of the HSM5 and closing of HSM6 switches (12, 22; see also Fig. 18). However, since switches HSM5 and HSM6 are in the manual control circuit including normally open switches M1 and M2 (12, 22), nothing happens. Approximately 90° later in the rotation of the cam 282 on shaft 268, the HSM7 switch (25) opens and the HSM4 switch (27) closes, whereupon the detector circuit is reconditioned for the next function. During this period and until the cam 282 has completed a revolution, the function shuttle or finger support 212 moves forward until fingers 220 cooperate with dogs 184 on function drum 182 to close the appropriate pre-selected switches on the back of switch support 226 for the next function, at which time switch HSM1 (17) and HSM2 (25) open. Opening the HSM1 switch deenergizes motors 272 and 436 while opening the HSM2 switch reconditions the holding circuit for the next energization of the SCR relay (23) and FCR relay (21) upon completion of the newly selected function.

The circuit for the manual control of the headstock is substantially the same as that shown and described in the previously-referred-to application of E. C. Bullard et al. Switches 58, 59, 60, PHB, PHD, PHE, PH2, PH3 and PH4 (65 to 73) are adapted selectively to be operated by the rotation of shaft 57 (Fig. 2) in the pendant P. The switches 74 (76) and 68 (78) are the starting switches, while the switch 75 (79) is the rat-tail stop switch on the pendant P. The MS solenoid (77) and the solenoid 76 (76) act to mechanically lock switch 74 in closed position when the automatic shifter is effective.

When it is desired to automatically select a headstock speed in a cycle of operations, a dog 184 on the function drum 182 closes switch 336 (53) thereby energizing the CSR relay (53) which opens CSR1 switch (75) for a purpose to be described later, and closes CSR2 switch (45). Closing CSR2 switch (45) energizes the motor 337 (45; see also Fig. 15) and the relay TMCR (41) for a purpose to be described later. When motor 337 starts to rotate, it closes switch 343 (46) by a cam 341 (Figs. 15 and 19) thereby holding motor 337 energized upon de-energizing of the CSR relay (53) when the switch 336 (53) opens as will be explained later. After 90° movement of the cam 342, switches 344 and 344' (50 and 55) are closed (Figs. 15 and 19, also). Closing switch 344 (50) energizes the motor 322 (50) to thereby start the backward motion of the shuttle or finger support 278. Indexing of the drum 182 may be effected without interference occurring between support 278 and the dogs 184 since finger support 278 is normally retained in its mid-rear position between headstock shifting selections. Closing switch 344' (55) energizes the CCR relay (55) which opens CCR1 switch (56) thereby de-energizing all of the headstock gear shifter solenoids 15, 16, 18, 19, 36, 37, 45, 46 and 49 (65 to 73). After 60° rotation of cam 324, switch 326 (51) is closed to hold motor 322 energized after opening of switch 344 (50) when the cam rise (Fig. 19) passes switches 344 and 344'. The construction and arrangement are such that it will take one second for cam 342 to go 90°, while cam 324 goes 60° in ⅓ sec. After 90° rotation of the cam 323 (Figs. 11, 15 and 20), switch 325 (75) opens. During this 90° motion of cam 323, shuttle or finger carrier 278 is at its rear position through the action of lever 312 where headstock change-gear solenoid switches 288 and 303 to 310 inclusive (56 to 64) are all cleared by the cooperation of the fingers 280 with the bar 285 (Fig. 9). After approximately 45° of additional rotation of cam 323, cam 329 (Figs. 8, 15 and 16) which is geared to cam 323 in a 1:1 ratio will cause switch 336 (53) to be opened by the pivoting of bell crank 331 in a direction to move switch 336 (53) away from button 227 (Fig. 16). This action also moves the finger 220 in mesh with the teeth 334 of bell crank 331 to its leftward position (Fig. 8) which prevents the re-closing of switch 336 (53) at the end of the revolution of cam 329. The finger 220 that initiated the closing of switch 336, as well as the one that is in mesh with teeth 334 of crank 331 are both cleared the next time the drum 182 is indexed. Opening switch 336 de-energizes CSR relay (53) thereby opening CSR2 switch (45) to stop motor 337 (45) and closing CSR1 switch (75). However, closing CSR1 switch does not energize solenoid 51 (75) because switch 325 (75) has just been opened as explained above. During this 45° additional rotation of cam 329 as well as during the continued rotation thereof, shuttle or finger carrier 278 moves from its rear position forwardly to actuate the newly selected fingers 280 in accordance with the setting of dogs 184 on the function drum 182. When the cams 323 and 324 complete a revolution, the switch 326 (51) opens and the switch 325 (75) closes. Opening switch 326 de-energizes motor 322, stopping it. Closing switch 325 (75) pre-sets the circuit for solenoid 51 (75), but since CSR1 switch (75) is now open due to switch 336 (53) being held open by the finger 220 in its left position (Fig. 8), nothing happens to the brake solenoid 51. Finally, completion of a revolution of cams 341 and 342 causes switch 343 (46) to open thereby stopping the motor 337 (45) with the entire circuit conditioned to automatically select another spindle speed when a dog 184 on the function drum 182 closes the switch 336 (53). During this final portion of a complete revolution of cams 323 and 324, the finger carrier 278 moves rearwardly to its mid-rear position where it remains until another automatic selection of a headstock speed is determined by a dog 184 on drum 182 in line with switch 336 (53).

When it is desired manually to set up the machine tool for an automatic cycle of operations, the lever 441 (Fig. 1) is moved to its middle position which causes the closing of switches A2 (25), A1 (29), and A5 (24); the opening of switches A3 (14) and A4 (20); and the opening of switches M1 (12), M2 (22) and M3 (40). This middle position of the lever 441 is referred to as automatic stop, wherein a function being performed upon completion will not effect indexing of the function drum 182 to its next succeeding station. In this way, the accuracy of each function during set-up can be checked and re-checked. Accordingly, at the completion of a function in automatic stop, one of the detector switches 390 or 401 closes, and since the corresponding distributor switch 440 is closed, current flows from the one side of the rectifier R (12) through CR2 switch (16), thence through the FCR relay (21) and the SCR relay (23), switch HSM4 (27), switch A1 (29), a distributor switch 440, a corresponding detector switch 390 or 401, to ground. Energization of the FCR relay (21) opens FCR1 switch (25) thereby de-energizing the solenoids for all functions (40 to 55) causing stopping of the head $H_m$. Also, energization of the FCR relay (21) closes switch FCR2 (15), but since switch A3 (15) is open in automatic stop, the motors 272 (10) and 436 (15) are not energized; consequently, drum 182 is not indexed.

Movement of the lever 441 (Fig. 1) to its lower or manual position opens all of the A switches and closes all of the M switches. Opening A5 switch (24) disconnects the switches 230′, 232 and 247 to 260 inclusive within the bracket $B_r$, while closing the M3 switch (40) places the solenoids 135, 136, 138, 139, 125, 124, 128, 127, 110, 111, 113, 114, 100, 101, 92 and 93 (40 to 55) under the control of the pendant P and removes them from control of the function drum 182. Likewise, opening the AS1, AS2, AS4 and AS3 switches (56, 58, 60 and 61) and closing the MS1, MS2, MS4 and MS3 switches (65, 67, 69 and 70) places the solenoids 45, 46, 37, 36, 49, 18, 19, 15 and 16 (65 to 73) under the the control of the pendant P and removes them from control of the function drum 182.

When the M1 switch (12) is closed, switch HSM5 (12) is held closed by cam 282 (Fig. 18), and the motors 272 and 436 are energized starting the backward motion of the shuttle or finger support 212. When support 212 is in its rear position, HSM5 switch (12) opens (Fig. 18) and HSM6 switch (22) closes. Accordingly, motors 272 and 436 stop until re-energized by raising the lever 441 to the automatic position.

With the shuttle or finger support 212 dormant in its rear position, the push-button switch (22) can be closed to manually index the function drum 182 as desired.

A legend for the various elements of Fig. 21 is contained in the following table:

DCCR—D. C. control relay
FCR—Function control relay
SCR—Safety control relay
HS6—Turret head shuttle control drum index switch
TC2—Turret control drum index switch
A6—Arc suppressor auto. switch
HSM2—Head shuttle control switch
HSM7—Head shuttle control switch
A2—Head shuttle auto. control switch
HSM4—Head shuttle control switch
A1—Head shuttle auto. control switch
HS9—Start main head set-up switch
HS10—Start main head from side head switch
2M—Coolant starter
1M—Main motor starter
CR1—Pendant start motor interlock relay
PSH—Side head start motor interlock switch
PTH—Turret start motor interlock switch
LPS—Lub. pressure switch
HS5—Head shuttle turret index switch
HSM1—Head shuttle motor holding switch
PCR2—Head shuttle motor start switch
HSM5—Headstock manual positioning switch
HSM3—Start control drum switch
CDM1—Control drum holding switch
HSM6—Manual control drum index set-up switch
TR2—#1 dwell control
TR3—#3 dwell control
PICS1—Pendant interlock control switch
CSR—Change speed relay
CCR—Clutch control relay Although the various features of the new and improved machine tool have been shown and described in detail to fully disclose one embodiment of the invention, it will be evident that numerous changes may be made in such details, and certain features may be used without others without departing from the principles of the invention.

What is claimed is:

1. In a programming apparatus for a machine capable of producing a large number of functions, comprising in combination, a function-selecting means having a plurality of portions, each adapted to be pre-set to render effective any of the functions of said machine; means adapted to index said function-selecting means in a step-by-step manner to render effective succeeding of said portions; a reciprocable shuttle member; an actuator for each function of said machine mounted for reciprocation on said shuttle member; means for moving said shuttle member along its reciprocative path away from said function-selecting means prior to the rendering effective of a succeeding portion of said function-selecting means; and positive acting means for causing relative reciprocation between said shuttle and said actuators during reciprocation of said shuttle.

2. In a programming apparatus for a machine capable of producing a large number of functions, comprising in combination, a function-selecting means having a plurality of portions, each adapted to be pre-set to render effective any of the functions of said machine; a synchronous motor for indexing said function-selecting means in a step-by-step manner to render effective succeeding of said portions; a reciprocable shuttle member; an actuator for each function of said machine mounted for reciprocation on said shuttle member; synchronous motor means for moving said shuttle along its reciprocative path away from and toward said function-selecting means; means for energizing the synchronous motor for said shuttle member prior to the energization of the synchronous motor for said function-selecting means; and positive acting means for causing relative reciprocation between said shuttle and said actuators during reciprocation of said shuttle.

3. In a programming apparatus for a machine capable of producing a large number of functions, comprising in combination, a function-selecting means having a plurality of portions, each adapted to be preset to render effective any of the functions of the machine; means adapted to index said function-selecting means in a step-by-step manner to render effective succeeding of said portions; a reciprocable shuttle member; an actuator for each function of said machine mounted for reciprocation on said shuttle member; oscillatable means for moving said shuttle member along its reciprocative path away from said function-selecting means; crank means for operating said oscillatable means; and positive acting means for causing relative reciprocation between said shuttle and said actuators during reciprocation of said shuttle.

4. In a programming apparatus for a machine capable of producing a large number of functions, comprising in combination, a function drum having a plurality of peripherally-spaced, axially-extending rows of holes adapted to receive replaceable dogs, each of said rows being adapted to be pre-set to render effective any of the functions of said machine; a synchronous motor for providing a partial revolution of said function drum to cause succeeding of said axially-disposed rows of pre-set dogs to become effective; a reciprocable shuttle member; an actuator for each function of said machine mounted for reciprocation on said shuttle member, and adapted to cooperate with the dogs on said function drum; another synchronous motor for moving said shuttle member along its reciprocative path away from said function drum prior to the rendering effective of the synchronous motor for indexing said function drum; and positive acting means for causing relative reciprocation between said shuttle and said actuators during reciprocation of said shuttle.

5. In a programming apparatus for a machine capable of producing a large number of functions, comprising in combination, a function-selecting means having a plurality of portions, each adapted to be pre-set to render effective any of the functions of said machine; means for rendering effective successive of said portions; a reciprocable shuttle member; an actuator for each function of said machine mounted for relative sliding movement of said reciprocable shuttle; an actuator-clearing member stationarily mounted in cooperating position relatively to said actuators; and means for moving said shuttle along its reciprocative path away from said function-selecting means prior to the rendering effective of a succeeding portion of said function-selecting means, whereby said actuator-clearing member neutralizes all of said actuators.

6. In a programming apparatus for a machine capable of producing a large number of functions, comprising in combination, a function-selecting means having a plurality of portions, each adapted to be pre-set to render effective any of the functions of said machine; a synchronous motor for indexing said function-selecting means in a step-by-step manner to operate said function-selecting means to cause succeeding of its portions to become effective; a reciprocable shuttle member; an actuator for each function of said machine mounted for reciprocation on said shuttle member; oscillatable means for reciprocating said shuttle along its path of movement toward and away from said function-selecting means; a crank for operating said oscillatable means; a synchronous motor for driving said crank means in a manner such that it becomes effective prior to the rendering effective of a succeeding portion of said function-selecting means; and positive acting means for causing relative reciprocation between said shuttle and said actuators during reciprocation of said shuttle.

7. In a programming apparatus for a machine capable of producing a large number of functions, comprising in combination, a function drum having a plurality of peripherally-spaced, axially-extending rows of holes adapted to receive dogs therein to render effective any of the functions of said machine; a synchronous motor for indexing said function drum from station to station to render effective successive of said rows of dogs; a reciprocable shuttle member; an actuator for each function of said machine mounted for reciprocation on said shuttle member; oscillatable means for reciprocating said shuttle member; crank means for driving said oscillatable means; a synchronous motor for driving said crank means to cause said shuttle member to move away from said function drum prior to the rendering effective of the synchronous motor for indexing said function drum; and positive acting means for causing relative reciprocation between said shuttle and said actuators during reciprocation of said shuttle.

8. In a programming apparatus for a machine capable of producing a large number of functions, comprising in combination, a function drum having a plurality of peripherally-spaced, axially-extending rows of holes adapted to receive dogs therein to render effective any of the functions of said machine; a synchronous motor for indexing said function drum to render effective succeeding of said rows of dogs; a reciprocable shuttle member; an actuator for each function of said machine supported by said shuttle member for relative sliding motion; a stationary clearing member mounted in cooperating position relatively to said shuttle member and said actuator members; and means for moving said shuttle member along its reciprocative path away from said function drum to thereby cause cooperation between said actuator members and said clearing member prior to the rendering effective of a succeeding set of said said dogs on said function drum.

9. In a programming apparatus for a machine capable of producing a large number of functions, comprising in combination, a function drum having a plurality of peripherally-spaced, axially-extending rows of holes adapted to receive removable dogs therein for rendering effective any of the functions of said machine; a synchronous motor for indexing said function drum to render effective succeeding of said rows of dogs; a reciprocable shuttle member; oscillatable means for reciprocating said shuttle member; crank means for operating said oscillatable means; an actuator for each function of said machine mounted on said reciprocable shuttle member for individual sliding motion thereon; an actuator-clearing member mounted in cooperating position relatively to said actuator elements; and another synchronous motor for effecting the movement of said shuttle along its reciprocative path away from said function drum to thereby effect clearing of said actuator elements prior to the rendering effective of a succeeding row of dogs of said function drum.

10. In a programming apparatus for a machine capable of producing a large number of functions, comprising in combination, a function drum having a plurality of peripherally-spaced, axially-extending rows of holes adapted to receive dogs; means for indexing said function drum from station to station comprising a synchronous motor and a worm drive; a shuttle member mounted in cooperating position relatively to said function drum and adapted to support a plurality of switch-actuating members for individual sliding motion relatively to said shuttle member; an electrical switch mounted on said shuttle member for each function of said machine and adapted to be operated by a corresponding actuator; racks on said shuttle member in mesh with oscillatable gears; crank means for oscillating said gears; and a synchronous motor for operating said crank means prior to the energization of the synchronous motor for indexing said function drum.

11. In a programming apparatus for a machine, a function-selecting means having a plurality of portions, each adapted to be pre-set to render effective any of the functions of said machine; means for rendering effective successive of said portions; separate reciprocable shuttle members for certain of said functions and each adapted to support at least one actuator for each of its corresponding functions; means for moving one of said shuttle members away from said function-selecting means prior to the rendering effective of a succeeding portion of said function-selecting means; and means for reciprocating said other shuttle member away from, and toward said function-selecting means independently of the movement of said one shuttle member.

12. In a programming apparatus for a machine, a function drum having a plurality of peripherally-spaced, axially-extending rows of holes adapted to be pre-set with a plurality of replaceable dogs to render effective any of the functions of said machine in accordance with a definite program; means for indexing said function drum from station to station to render effective succeeding of said rows of pre-set dogs; separate reciprocable shuttle members for certain of said functions and each adapted to support at least one actuator for each of its corresponding functions; means for moving one of said shuttle members away from said function drum prior to indexing said function drum to its next succeeding station; and means for reciprocating said other shuttle member way from, and toward said function drum independently of the movement of said one shuttle member.

13. In a programming apparatus for a machine, a function-selecting means having a plurality of portions, each adapted to be pre-set to render effective any of the portions of said machine; a synchronous motor for rendering effective successive of said portions; separate reciprocable shuttle members for certain of said functions and each adapted to support at least one actuator for each of its corresponding functions; another synchronous motor for moving one of said shuttle members away from said function-selecting means prior to the rendering effective of a succeeding portion of said function-selecting means; and another synchronous motor for reciprocating said other shuttle member away from, and toward said function-selecting means independently of the movement of said one shuttle member.

14. In a programming apparatus for a machine, a function-selecting means having a plurality of portions, each adapted to be pre-set to render effective any of the functions of said machine; means for rendering effective successive of said portions; separate reciprocable shuttle members for certain of said functions, each adapted to support at least one actuator for each of its corresponding functions; a clearing bar for each of said shuttle members, stationarily mounted in cooperating position relatively to said actuators; means for moving one of said shuttle members away from said function-selecting means prior to the rendering effective of a succeeding portion of said function-selecting means; and means for reciprocating said other shuttle member away from, and toward said function-selecting means, independently of the movement of said one shuttle member, the construction and arrangement of the parts being such that movement of said shuttle members causes the clearing bars to neutralize said actuator bars.

15. In a programming apparatus for a machine, a function-selecting means having a plurality of portions, each adapted to be pre-set to render effective any of the functions of said machine; means for rendering effective successive of said portions; separate reciprocable shuttle members for certain of said functions and each adapted to support at least one actuator for each of its corresponding functions; oscillatable means for moving one of said shuttle members away from said function-selecting means prior to the rendering effective of a succeeding portion of said function-selecting means; crank means for operating said oscillatable means; separate oscillatable means for reciprocating said other shuttle member away from, and toward said function-selecting means; and separate crank means for operating the oscillatable means for said other shuttle member independently of the operation of the crank means for said one shuttle member.

16. In a programming apparatus for a machine, a function-selecting means having a plurality of portions each adapted to be pre-set to render effective any of the functions of said machine; means for rendering effective successive of said portions; separate reciprocable shuttle members for certain of said functions and each adapted to support at least one actuator for each of its corresponding functions; means for moving one of said shuttle members away from said function-selecting means prior to the rendering effective of a succeeding portion of said function-selecting means; and means responsive to the reciprocation of said one shuttle member for effecting the reciprocation of said other shuttle member away from, and toward said function-selecting means.

17. In a programming apparatus for a machine, a function drum having a plurality of peripherally-spaced, axially-extending rows of openings adapted to receive switch-actuating dogs in a predetermined pattern thereon, to render effective any of the functions of said machine in accordance with a predetermined sequence; a synchronous motor for indexing said function drum from station to station, whereby succeeding rows of said pre-set dogs become effective; separate reciprocable shuttle members for certain of said functions and each adapted to support at least one actuator for each of its corresponding functions; a synchronous motor for moving one of said shuttle members away from said function-selecting means prior to the energizing of the synchronous motor for indexing said function drum; and another synchronous motor for reciprocating said other shuttle member away from, and toward said function drum independently of the movement of said one shuttle member.

18. In a programming apparatus for a machine, a function-selecting means having a plurality of portions, each adapted to be pre-set to render effective any of the functions of said machine; a synchronous motor for rendering effective successive of said portions; separate reciprocable shuttle members for certain of said functions and each adapted to support at least one actuator for each of its corresponding functions, said actuators being adapted to slide on their corresponding reciprocable shuttle members; a clearing bar for each of said shuttle members; and means for moving said shuttle members away from, and toward said function-selecting means independently of the movement of the other, whereby each clearing bar is adapted to neutralize the actuators on its corresponding shuttle member.

19. In a programming apparatus for a machine, a function-selecting means having a plurality of portions, each adapted to be pre-set to render effective any of the functions of said machine; means for rendering effective successive of said portions; separate reciprocable shuttle members for certain of said functions and each adapted to support at least one actuator for each of its corresponding functions; a clearing bar for each of said shuttle members adapted to cooperate with said actuators to neutralize them upon the reciprocation of the respective shuttle members; oscillatable means for moving said shuttle members away from, and toward said function-selecting means independently of the movement of each other; and crank means for operating said oscillatable means.

20. In a programming apparatus for a machine, a function-selecting means having a plurality of portions, each adapted to be pre-set to render effective functions of said machine; means for rendering effective successive of said portions; separate reciprocable shuttle members for certain of said functions and each adapted to support at least one actuator for each of its corresponding functions; oscillatable means for moving said shuttle members away from, and toward said function-selecting means independently of the movement of each other; crank means for operating said oscillatable means; and means responsive to the movement of one of said shuttle members for effecting the operation of the crank means for said other shuttle members.

21. In a programming apparatus for a machine capable of producing a large number of functions, comprising in combination, a function-selecting means having a plurality of portions, each adapted to be pre-set to render effective functions of said machine; function-duration means having a plurality of portions, one for each of said function-selecting portions and each adapted to be pre-set to determine the duration of a function initiated by said function-selecting means; a distributor adapted to energize a function-duration portion when its corresponding function-selecting portion is effective; an electrical switch for each of said function-duration portions mounted on a support in cooperative position relatively to said distributor; and means for rendering effective succeeding of said function-selecting and function-duration portions including means for moving said switch support and the corresponding switches thereon out of cooperating position with said distributor prior to the rendering effective of succeeding of said function-selecting and function-duration portions.

22. In a programming apparatus for a machine capable of producing a large number of functions, comprising in combination, a function drum having a plurality of peripherally-spaced, axially-extending rows of holes adapted to receive adjustable dogs in a predetermined pattern to render effective functions of said machine; function-duration means having a plurality of portions, one for each of said axially-disposed rows of holes in said function drum, and each adapted to be pre-set to determine the duration of a function initiated by said function drum; a distributor adapted to energize a function-duration portion when its corresponding row of dogs on said function drum is effective; an electrical switch for each of said function-duration portions mounted on a support in cooperating position relatively to said distributor; a synchronous motor for indexing said function drum from station to station and for rendering effective corresponding function-duration portions; and means for moving said switch support and the corresponding switches thereon out of cooperating position with said distributor prior to the energization of said synchronous motor.

23. In a programming apparatus for a machine capable of producing a large number of functions, comprising in combination, a function-selecting means having a plurality of portions, each adapted to be pre-set to render effective functions of said machine; function-duration means comprising a plurality of rotary discs, one for each of said function-selecting portions, and each adapted to be pre-set to determine the duration of a function initiated by said function-selecting means; a distributor; an electrical switch for each of said function-duration discs mounted on a support in cooperative position relatively to said distributor; and means for rendering effective succeeding of said function-selecting portions and corresponding function-duration discs, including means for moving said switch support and the corresponding switches thereon out of cooperating position with said distributor prior to the rendering effective of succeeding of said function-selecting portions and corresponding function-duration discs.

24. In a programming apparatus for a machine capable of producing a large number of functions, comprising in combination, a function drum having a plurality of peripherally-spaced, axially-extending rows of holes adapted to receive a plurality of dogs in a given pattern for rendering effective functions of said machine; function-duration means having a plurality of portions, one for each of said rows of holes on said function drum, and each adapted to be pre-set to determine the duration of a function initiated by said function drum; a distributor adapted to render effective a function-duration portion when its corresponding row of holes in the function drum is effective; an electrical switch for each of said function-duration portions mounted on a support in cooperating position relatively to said distributor; means for indexing said drum and said distributor simultaneously from station to station; and means for moving said switch support and the corresponding switches thereon out of cooperating position with said distributor prior to the indexing of said function drum and distributor.

25. In a programming apparatus for a machine capable of producing a large number of functions, comprising in combination, a function drum having a plurality of peripherally-spaced, axially-extending rows of holes adapted to receive a plurality of adjustable dogs to render effective functions of said machine; function-duration means having a plurality of portions, one for each of the axial rows of holes on the periphery of said function drum, and each adapted to be pre-set to determine the duration of a function initiated by said function drum; a distributor adapted to render effective a function-duration when its corresponding row of holes on the function drum is effective; an electrical switch for each of said function-duration portions mounted on a support in cooperative position relatively to said distributor; a synchronous motor and worm drive between said function drum and said distributor for indexing the two simultaneously; and means for moving said switch support and the corresponding switches thereon out of cooperating position with said distributor prior to the energization of said synchronous motor.

26. In a programming apparatus for a machine capable of producing a large number of functions, comprising in combination, a function-selecting means having a plurality of portions, each adapted to be pre-set to render effective functions of said machine; a reciprocable shuttle member adapted to support an actuator for each function of said machine; function-duration means having a plurality of portions, one for each of said function-selecting portions and each adapted to be pre-set to determine a function initiated by said function-selecting means; a distributor adapted to render effective a function-duration portion when its corresponding function-selecting portion is effective; an electrical switch for each of said function-duration portions mounted on a support in cooperative position relatively to said distributor; an electrical switch for each of said actuators mounted on said shuttle member; and means for rendering effective succeeding of said function-selecting and function-duration portions including means for moving said switch support and said shuttle member out of cooperating position with said distributor and said function-selecting means prior to the rendering effective of succeeding of said function-selecting and function-duration portions.

27. In a programming apparatus for a machine capable of producing a large number of functions, comprising in combination, a function drum having a plurality of peripherally-spaced, axially-extending rows of holes adapted to receive a plurality of dogs for rendering effective functions of said machine; a reciprocable shuttle member adapted to support an actuator for each function of said machine; an electrical switch on said shuttle member for each of said actuators; function-duration means having a plurality of portions, one for each of said axially-extending rows of holes on said function drum, and each adapted to be pre-set to determine the function initiated by a row of holes on said function drum; a distributor adapted to render effective a function-duration portion when its corresponding row of holes on the function drum is effective; an electrical switch for each of said function-duration portions mounted on a support in cooperative position relatively to said distributor; synchronous motor means for indexing said function drum and said distributor from station to station simultaneously; and other synchronous motor means for moving said switch support and said shuttle member together with the switches thereon out of cooperating position with respect to said distributor and said function drum prior to the energization of the synchronous motor for indexing said distributor and said function drum.

28. In a programming apparatus for a machine capable of producing a large number of functions, comprising in combination, a function-selecting means having a plurality of portions, each adapted to be pre-set to render effective functions of said machine; a reciprocable shuttle member adapted to support an actuator for each function of said machine; an electrical switch on said shuttle member for each of said actuators; function-duration means comprising a rotary disc for each of the portions of said function-selecting means, each of said discs being adapted to be adjusted to determine the duration of a function initiated by said function-selecting means; a distributor adapted to render effective a function-duration disc when its corresponding function-selecting portion is effective; an electrical switch for each of said function-duration discs mounted on a support in cooperating position relatively to said distributor; and means for rendering effective succeeding of said function-selecting portions and corresponding function-duration discs, including means for moving said switch support and said shuttle member together with the corresponding switches thereon out of cooperating position with said distributor and said function-selecting means prior to the rendering effective of succeeding of said function-selecting portions and said function-duration discs.

29. In a programming apparatus for a machine capable of producing a large number of functions, comprising in combination, a function drum having a plurality of peripherally-spaced, axially-extending rows of holes adapted to receive a plurality of dogs in a given pattern to render effective functions of said machine in accordance with a predetermined order; function-duration means having a plurality of portions, one for each of said rows of axially-extending holes, and each adapted to be pre-set to determine the duration of a function initiated by a pre-set row of said holes on said function drum; a distributor adapted to render effective a function-duration portion when its corresponding rows of holes on said function drum is effective; a reciprocable shuttle member adapted to support an actuator for each function of said machine, and a switch in cooperative position relatively to each of said actuators; an electrical switch for each of said function-duration portions mounted on a support in co-operative position relatively to said distributor; means for simultaneously rendering effective succeeding of said rows of pre-set holes on said function drum and the corresponding function-duration portions; and means for moving said switch support and said shuttle member together with their corresponding switches out of cooperating position with said distributor and said function drum prior to the rendering effective of succeeding of said rows of holes on said function drum and the corresponding function-duration portions.

30. In a programming apparatus for a machine capable of producing a large number of functions, comprising in combination, a function drum having a plurality of peripherally-spaced, axially-extending rows of holes adapted to support a plurality of adjustable dogs to render effective functions of said machine; a reciprocable shuttle member adapted to support an actuator for each function of said machine, as well as an electrical switch adapted to be actuated by said actuator; function-duration means having a plurality of portions, one for each of said rows of pre-set holes on said function drum, and each adapted to be pre-set to determine the duration of a function initiated by said function drum; a distributor adapted to render effective a function-duration portion when its corresponding row of pre-set holes is effective; an electrical switch for each of said function-duration portions mounted on a support in cooperating position relatively to said distributor; a synchronous motor for indexing said function drum and for rendering effective succeeding portions of said function-duration means; and other synchronous motor means for moving said switch support and said shuttle member with their corresponding switches out of cooperating position with said distributor and said function drum prior to the energization of the synchronous motor for indexing said function drum and for rendering effective said function-duration means.

31. In a programming apparatus for a machine capable of producing a large number of functions, comprising in combination, a function drum having a plurality of peripherally-spaced, axially-extending rows of holes adapted to support a plurality of dogs for rendering effective functions of said machine; function-duration means including a rotary disc for each of the axially-extending rows of holes on the periphery of said function drum, each of said discs being adapted to be adjusted to determine the duration of a function initiated by its corresponding pre-set row of holes on said function drum; a reciprocable shuttle member adapted to support an actuator for each function of said machine, as well as an electrical switch adapted to be operated by said actuator; a distributor adapted to render effective each of said function-duration discs when its corresponding row of pre-set holes is effective on said function drum; an electrical switch for each of said function-duration discs mounted on a support in cooperating position relatively to said distributor; synchronous motor means for indexing said function drum and said distributor; and other synchronous motor means for moving said switch support and said shuttle member together with their corresponding switches out of cooperating position with said distributor and said function drum prior to the energization of said synchronous motor for indexing said function drum and distributor.

32. In a programming apparatus for a machine capable of producing a large number of functions, comprising in combination, a function-selecting means having a plurality of portions, each adapted to be pre-set to render effective functions of said machine; a reciprocable shuttle member adapted to support at least one actuator for each function of said machine; function-duration means having a plurality of portions, one for each of said function-selecting portions, and each adapted to be pre-set to determine the duration of a function initiated by said function-selecting means; an electrical switch for each of said function-duration portions; a support for said switches; a distributor for actuating said electrical switches consecutively; a synchronous motor for simultaneously rendering effective succeeding portions of said function-selecting means and for operating said distributor; another synchronous motor for moving said shuttle and said switch support, respectively, away from said function-selecting means and said distributor; and means responsive to the movement of said shuttle and switch support for energizing said first-mentioned synchronous motor.

33. In a programming apparatus for a machine capable of producing a large number of functions, comprising in combination, a function drum having a plurality of peripherally-spaced, axially-extending rows of holes adapted to receive a plurality of dogs in a predetermined pattern to render effective functions of said machine in accordance with a predetermined order; a synchronous motor for indexing said function drum from station to station; a reciprocable shuttle member adapted to support at least one actuator for each function of said machine; function-duration means having a plurality of portions, one for each of said rows of holes in the periphery of said function drum, and each adapted to be pre-set to determine the duration of a function initiated by said function drum; an electrical switch for each of said function-duration portions; a support for said switches; a distributor for actuating said electrical switches consecutively; another synchronous motor for moving said shuttle and said switch support, respectively, away from said function drum and said distributor; and means responsive to the operation of the synchronous motor that moves said shuttle member for energizing the synchronous motor that indexes the function drum.

34. In a programming apparatus for a machine capable of producing a large number of functions, comprising in combination, a function-selecting means having a plurality of portions, each adapted to be pre-set to render effective functions of said machine; a reciprocable shuttle member adapted to support at least one actuator for each function of said machine; oscillatable means for moving said shuttle member; crank means for operating said oscillatable means; function-duration means having a plurality of portions, one for each of said function-selecting portions and each adapted to be pre-set to determine the duration of a function initiated by said function-selecting means; an electrical switch for each of said function-duration portions; a support for said switches; a distributor for actuating said electrical switches consecutively; a synchronous motor for operating said crank means and for moving said switch support away from said distributor; and means responsive to the operation of said synchronous motor for initiating the rendering effective of the next succeeding function-selecting portion and its corresponding function-duration portion.

35. In a programming apparatus for a machine capable of producing a large number of functions, comprising in combination, a function-selecting means having a plurality of portions, each adapted to be pre-set to render effective functions of said machine; a reciprocable shuttle member adapted to support at least one actuator for each function of said machine; function-duration means including a plurality of rotary discs, each adapted to be adjusted relatively to the other, and one for each of said function-selecting portions, each of said discs being adapted to be pre-set to determine the duration of a function initiated by said function-selecting means; an electrical switch for each of said discs; a support for said switches; a distributor for actuating said electrical switches consecutively; a synchronous motor for moving said shuttle member and said switch support, respectively, away from said function-selecting means and said distributor; and means responsive to the operation of said synchronous motor for initiating the rendering effective of the next succeeding function-selecting portion and its corresponding function-duration portion.

36. In a programming apparatus for a machine capable of producing a large number of functions, comprising in combination, a function-selecting means having a plurality of portions, each adapted to be pre-set to render effective functions of said machine; a reciprocable shuttle member adapted to support at least one actuator for each function of said machine; function-duration means having a plurality of portions, one for each of said function-selecting portions, and each adapted to be pre-set to determine the duration of a function initiated by said function-selecting means; an electrical switch for each of said function-duration portions; supports for said switches; a distributor located between said supports and provided with a plurality of dogs in two spirally-arranged paths in non-aligned relationship; a synchronous motor for moving said shuttle member and said switch supports, respectively, away from said function-selecting means and said distributor; and means responsive to the operation of said synchronous motor for initiating the rendering effective of the next succeeding function-selecting portion and its corresponding function-duration portion.

37. A distributor for a programming apparatus comprising a drum having two spirally-arranged rows of dogs disposed at 180° intervals about the periphery of said drum, said dogs being circumferentially non-aligned; switch supports arranged on opposite sides of said drum; and switches on each of said supports, the construction and arrangement of the dogs and switches being such that the dogs in one of the spirally-arranged rows of dogs cooperate with only the switches on one of said supports.

38. In a programming apparatus for a machine capable of producing a large number of functions, comprising in combination, a function-selecting means having a plurality of portions, each adapted to be pre-set to render effective functions of said machine; a reciprocable shuttle member adapted to support at least one actuator for each function of said machine; function-duration means having a plurality of portions, one for each of said function-selecting portions, and each adapted to be pre-set to determine the duration of a function initiated by said function-selecting means; an electrical switch for each of said function-duration portions; a support for said switches; a distributor for actuating said electrical switches consecutively; a synchronous motor for moving said shuttle member and said switch support, respectively, away from said function-selecting means and said distributor; and cams operated by the synchronous motor that moves said shuttle member for initiating the rendering effective of the next succeeding function-selecting portion and its corresponding function-duration portion.

39. In a programming apparatus for a machine capable of producing a large number of functions, comprising in combination, a function drum including a plurality of peripherally-spaced, axially-extending rows of holes adapted to receive a plurality of dogs in a predetermined pattern to render effective functions of said machine in a predetermined manner; a synchronous motor for indexing said function drum from station to station; a reciprocable shuttle member adapted to support at least one actuator for each function of said machine; function-duration means having a plurality of portions, one for each of said rows of holes on the periphery of said function drum, and each adapted to be pre-set to determine the duration of a function initiated by said function drum; an electrical switch for each of said function-duration portions; a support for said switches; a distributor for actuating said electrical switches consecutively and driven by the synchronous motor that indexes said function drum; another synchronous motor for moving said shuttle member and said switch support, respectively, away from said function-drum and said distributor; cams operated by the synchronous motor for moving said shuttle member; and means responsive to the operation of said cams for energizing the synchronous motor for indexing said function drum and said distributor.

40. In a programming apparatus for a machine capable of producing a large number of functions, comprising in combination, a function drum having a plurality of peripherally-spaced, axially-extending rows of holes adapted to support a plurality of dogs in a predetermined pattern to render effective functions of said machine; a synchronous motor for indexing said function drum from station to station; a shuttle member adapted to support at least one actuator for each function of said machine; a clearing bar stationarily mounted relatively to said actuators for neutralizing said actuators during the reciprocation of said shuttle member; function-duration means comprising a rotatably-adjustable disc for each row of holes on the perriphery of said function drum, each disc being adapted to be pre-set to determine the duration of a function initiated by said function drum; an electrical switch for each of said function-duration discs; a support for said switches; a distributor for actuating said electrical switches consecutively; a synchronous motor for moving said shuttle member and said switch support, respectively, away from said function drum and said distributor; and means responsive to the operation of the synchronous motor that moves said shuttle member for energizing the synchronous motor that indexes the function drum.

41. In a programming apparatus for a machine capable of producing a large number of functions, comprising in combination, a function drum having a plurality of peripherally-spaced, axially-extending rows of holes adapted to support a plurality of dogs in a predetermined arrangement to render effective functions of said machine; a synchronous motor for indexing said function drum from station to station; a reciprocable shuttle member adapted to support at least one actuator for each function of said machine; a clearing bar stationarily mounted relatively to said actuators to neutralize said actuators upon the reciprocation of said shuttle member; function-duration means comprising a rotatable disc for each row of holes about the periphery of said function drum and each adapted to be pre-set to determine the duration of a function initiated by the function drum; an electrical switch for each of said function-duration discs; a support for said switches; a distributor for actuating said electrical switches consecutively; another synchronous motor for moving said shuttle member and said switch support, respectively, away from said function drum and said distributor; and cam means operated by the synchronous motor that moves said shuttle member, said cam means being adapted to energize the synchronous motor that indexes the function drum.

42. In a programming apparatus for a machine, a function-selecting means having a plurality of portions, each adapted to be pre-set to render effective any of said functions; a first reciprocable shuttle member adapted to support at least one actuator for each of a plurality of said functions; means for reciprocating said first shuttle member to cause it to cooperate with said function-selecting means to render effective one of its corresponding functions; a separate shuttle member normally maintained in a position out of cooperating position with said function-selecting means; and means on said first shuttle member for initiating the reciprocation of said other shuttle member to move it into and out of cooperation with said function-selecting means.

43. In a programming apparatus for a machine, a function drum having a plurality of peripherally-spaced, axially-disposed rows of holes adapted to support adjustable dogs to render effective any of said functions; a synchronous motor for indexing said function drum from station to station; a first reciprocable shuttle member adapted to support at least one actuator for each of a plurality of said functions; means for reciprocating said first shuttle member to cause it to cooperate with said function drum to render effective one of its corresponding functions; a separate shuttle member normally maintained in a position out of cooperating position with said function drum; and means on said first shuttle member for initiating the reciprocation of said separate shuttle member.

44. In a programming apparatus for a machine, a function-selecting means having a plurality of portions, each adapted to be pre-set to render effective any of said functions; a reciprocable shuttle member, adapted to support at least one actuator for each of a plurality of said functions; oscillatable means for reciprocating said shuttle member; crank means adapted to operate said oscillatable means; a separate shuttle member normally maintained in a position out of cooperating position with said function-selecting means; synchronous motor means for moving said one shuttle member; separate synchronous motor means for moving said other shuttle member; and means on said one shuttle member for energizing the synchronous motor means for reciprocating said other shuttle member.

45. In a programming apparatus for a machine, a function-selecting means having a plurality of portions, each adapted to be pre-set to render effective any of said functions; a reciprocable shuttle member adapted to support at least one actuator for each of a plurality of said functions; a clearing bar stationarily mounted relatively to said shuttle member; means for reciprocating said shuttle member to cause said bar to neutralize the actuators thereon and to cause them to cooperate with said function-selecting means to render effective a function of said machine; a separate shuttle member adapted to support at least one actuator for each of a plurality of other functions; a clearing bar stationarily mounted relatively to said separate shuttle member; and means on said one shuttle member for initiating the reciprocation of said other shuttle member to move it in a manner to neutralize the actuators thereon and to move it sequentially from a position out of cooperating position with said function-selecting means into cooperating position therewith and out of cooperating position therewith.

46. In a programming apparatus for a machine, a function-selecting means having a plurality of portions, each adapted to be pre-set to render effective any of said functions; function-duration means including a plurality of rotatably adjustable discs, one for each of said portions of the function-selecting means, each adapted to be pre-set to determine the duration of one of said functions; a reciprocable shuttle member, adapted to support at least one actuator for each of a plurality of said functions; means for reciprocating said shuttle member to cause it to cooperate with said function-selecting means to render effective one of its corresponding functions; a separate shuttle member normally maintained in a position out of cooperating position with said function-selecting means; and means on one of said shuttle members for initiating the reciprocation of said other shuttle member.

47. In a programming apparatus for a machine, a function-selecting means having a plurality of portions, each adapted to be pre-set to render effective any of said functions; a reciprocable shuttle member for certain of said functions, adapted to support at least one actuator for each of its corresponding functions; synchronous motor means for reciprocating said shuttle member to cause it to cooperate with said function-selecting means to render effective one of its corresponding functions; a separate shuttle member for other of said functions normally maintained in a position out of cooperating position with said function-selecting means; a separate synchronous motor means for reciprocating said separate shuttle member; means on said first mentioned shuttle member for energizing said separate synchronous motor means for causing said separate shuttle member to be reciprocated; and cam means operated by said second-mentioned synchronous motor means for effecting its de-energization when said separate shuttle member is moved out of cooperating position relatively to said function-selecting means subsequently to cooperation therewith.

48. In a programming apparatus for a machine, a function-selecting means having a plurality of portions, each adapted to be pre-set to render effective any of said functions; a reciprocable shuttle member normally maintained in a position out of cooperating position with said function-selecting means, whereby said function-selecting means can be rendered effective without interference with said shuttle member; and means for reciprocating said shuttle member from its normal rest position rearwardly away from said function-selecting means, thence forwardly into cooperating position relatively to said function-selecting means, and finally, rearwardly away from said function-selecting means.

49. In a programming apparatus for a machine, a function-selecting means having a plurality of portions, each adapted to be pre-set to render effective any of said functions; a reciprocable shuttle member for said transmission normally maintained in a position out of cooperating position with said function-selecting means; oscillatable means for reciprocating said shuttle member; crank means for operating said oscillatable means; a synchronous motor for operating said crank means; and cams associated with said crank means for controlling the reciprocation of said shuttle member from a position out of cooperating position relatively to said function-selecting means rearwardly, thence forwardly into cooperating position with said function-selecting means, and finally, rearwardly to a rest position.

50. In a programming apparatus for a machine, a function-selecting means having a plurality of portions, each adapted to be pre-set to render effective any of said functions; a reciprocable shuttle member, adapted to support at least one actuator for each of certain of said functions; a synchronous motor for reciprocating said shuttle member; a function-determining means comprising a plurality of rotatably-adjustable discs, one for each of said portions of said function-selecting means and each adapted to be pre-set to determine the duration of a corresponding function; an electrical distributor for rendering effective succeeding of said discs simultaneously with the rendering effective of its corresponding function-selecting portion; a synchronous motor for rendering effective successive of said function-selecting portions and corresponding distributor portions; cam means operable with said shuttle reciprocation for rendering effective the synchronous motor that drives the function-selecting means and said distributor means; a separate shuttle member normally maintained in a position out of cooperating position with said function-selecting means; synchronous motor means for reciprocating said separate shuttle member; and means on said first mentioned shuttle member for energizing the synchronous motor for reciprocating said separate shuttle member.

51. In a programming apparatus for a machine capable of producing a large number of functions, comprising in combination, a function-selecting means having a plurality of portions, each adapted to be pre-set to render effective functions of said machine; a function-duration means including a rotatably-adjustable disc having a fixed dog thereon for each portion on said function-selecting means; a separate switch for each of said discs; micrometer means for adjusting said switch relatively to the dog on its corresponding disc; and means for maintaining said switches and portions of said function-selecting means in exact phase relation at all times.

52. In a programming apparatus for a machine capable of producing a large number of functions, comprising in combination, a function-selecting means having a plurality of portions, each adapted to be pre-set to render effective functions of said machine; a function-duration means including a rotatably-adjustable disc having a fixed dog thereon for each portion on said function-selecting means; a separate switch for each of said discs; micrometer means for adjusting said switch relatively to the dog on its corresponding disc; a distributor for maintaining said switches and portions on said function-selecting means in extract phase relation at all times; and synchronous motor means for simultaneously driving said function-selecting means and said distributor.

53. In a programming apparatus for a machine capable of moving a member along a plurality of paths of motion, comprising in combination, a function-selecting means having a plurality of portions each adapted to be pre-set to cause said member to be moved along either of its paths of motion; a function-duration means including a disc for each path of motion of said movable member for each of said portions on said function-selecting means; a separate switch for each of said discs; micrometer means for adjusting said switch relatively to the dog on its corresponding disc; and means for maintaining each of the portions of said function-selecting means and its corresponding switches in exact phase relation at all times.

54. In a programming apparatus for a machine capable of moving a member along a plurality of paths of motion, comprising in combination, a function-selecting means having a plurality of portions, each adapted to be pre-set to cause said member to move along any of its paths of motion; a function-duration means including a series of rotatably-adjustable discs for each path of motion of said movable member, there being a disc in each series for each portion on said function-selecting means; a separate switch for each of the discs in each series; common means for adjusting the switches in each series that correspond to the same portion on the function-selecting means; and means for maintaining said portions on said function-selecting means and the corresponding switches in exact phase relation at all times.

55. In a programming apparatus for a machine capable of producing a large number of functions, comprising in combination, a function-selecting means having a plurality of portions, each adapted to be pre-set to render effective functions of said machine; a function-duration means including a drum comprising a plurality of rotatably-adjustable discs, each having a fixed dog thereon, there being provided a disc for each portion of said function-selecting means; a separate switch for each of said discs; micrometer means for adjusting said switch relatively to the dog on its corresponding disc; means for removably mounting said drum in cooperating position relatively to said switches; and means for maintaining said switches and portions in exact phase relation at all times.

56. In a programming apparatus for a machine capable of producing a large number of functions, comprising in combination, a function-selecting means having a plurality of portions, each adapted to be pre-set to render effective functions of said machine; a function-duration means including a rotatably-adjustable disc having a fixed dog thereon for each portion of said function-selecting means; a separate switch for each of said discs; means for facilitating the approximate setting of said dog relative to its corresponding switch; micrometer means for adjusting said switch relatively to the dog on its corresponding disc; and means for maintaining said switches and portions in exact phase relation at all times.

57. In a programming apparatus for a machine capable of producing a large number of functions, comprising in combination, a function-selecting means having a plurality of portions, each adapted to be pre-set to render effective functions of said machine; a function-duration means including a rotatably-adjustable disc having a fixed dog thereon for each portion on said function-selecting means; a separate switch for each of said discs; a datum pin adapted to cooperate with notches in the periphery of said disc to approximately set the dog of said disc in cooperative position with respect to its corresponding switch; and micrometer means for adjusting the position of said switch relatively to said dog.

58. In a programming apparatus for a machine capable of producing a large number of functions, comprising in combination, a function-selecting means having a plurality of portions, each adapted to be pre-set to render effective functions of said machine; a reciprocable shuttle member adapted to support an actuator for each function of said machine; a function-duration means including a rotatably-adjustable disc having a fixed dog thereon for each portion on said function-selecting means; a separate switch for each of said discs; micrometer means for adjusting each switch relatively to the dog on its corresponding disc; means for maintaining said switches and portions in exact phase relation at all times; and means for moving said shuttle along its reciprocative path away from said function-selecting means prior to the rendering effective of a succeeding portion of said function-selecting means.

59. In a programming apparatus for a machine capable of producing a large number of functions, comprising in combination, a function-selecting means having a plurality of portions, each adapted to be pre-set to render effective functions of said machine; a reciprocable shuttle member adapted to support an actuator for each function of said machine; a function-duration means including a rotatably-adjustable disc having a fixed dog thereon for each portion on said function-selecting means; a separate switch for each of said discs; micrometer means for adjusting each switch relatively to the dog on its corresponding disc; a distributor; synchronous motor means for simultaneously rendering effective succeeding portions of said function-selecting means and said distributor to maintain said switches and portions in exact phase relation at all times; and synchronous motor means for moving said shuttle along its reciprocative path away from said function-selecting means prior to the energization of the synchronous motor for rendering effective succeeding portions of said function-selecting means.

References Cited in the file of this patent

UNITED STATES PATENTS

| | | |
|---|---|---|
| 469,652 | Jennings | Feb. 23, 1892 |
| 1,166,030 | Willower et al. | Dec. 28, 1915 |
| 1,242,260 | Stone | Oct. 9, 1917 |
| 1,801,129 | Warren | Apr. 14, 1931 |
| 2,255,739 | Curtis | Sept. 9, 1941 |
| 2,339,839 | Curtis | Jan. 25, 1944 |
| 2,511,821 | Bullard | June 13, 1950 |
| 2,551,959 | Marshall | May 8, 1951 |